US010562998B2

(12) United States Patent
Faust et al.

(10) Patent No.: US 10,562,998 B2
(45) Date of Patent: Feb. 18, 2020

(54) HIGH STRENGTH POLYISOBUTYLENE POLYURETHANES

(71) Applicant: University of Massachusetts, Boston, MA (US)

(72) Inventors: Rudolf Faust, Lexington, MA (US); Xinyu Wei, Lowell, MA (US)

(73) Assignee: University of Massachusetts, Boston, MA (US)

( * ) Notice: Subject to any disclaimer, the term of this patent is extended or adjusted under 35 U.S.C. 154(b) by 141 days.

(21) Appl. No.: 15/927,437

(22) Filed: Mar. 21, 2018

(65) Prior Publication Data
US 2018/0208698 A1    Jul. 26, 2018

Related U.S. Application Data

(62) Division of application No. 14/433,974, filed as application No. PCT/US2013/071170 on Nov. 21, 2013, now Pat. No. 9,926,399.
(Continued)

(51) Int. Cl.
*C08F 293/00* (2006.01)
*C08G 18/62* (2006.01)
(Continued)

(52) U.S. Cl.
CPC ............ *C08F 293/00* (2013.01); *C08G 18/10* (2013.01); *C08G 18/6204* (2013.01); *C08G 18/6511* (2013.01)

(58) Field of Classification Search
CPC ... C08F 293/00; C08G 18/6204; C08G 18/10; C08G 18/6511
See application file for complete search history.

(56) References Cited

U.S. PATENT DOCUMENTS 3,069,236 A    12/1962   Schultz et al.
3,148,028 A     9/1964   Schultz et al.
(Continued)

FOREIGN PATENT DOCUMENTS

BR    9003841 A    2/1992
CA    2278680 A1   8/1998
(Continued)

OTHER PUBLICATIONS

"Butyl Rubber Properties and Applications", downloaded form URL: hiit://ww.iisrp.com/WebPolymers/02ButylRubberIIR.pdf availale on the Internet on Jul. 31, 2007 according to Wayback Web Archive.
(Continued)

*Primary Examiner* — Michael M Dollinger
(74) *Attorney, Agent, or Firm* — Faegre Baker Daniels, LLP

(57) ABSTRACT

An elastomeric polymer, comprising (1) a hard segment in the amount of 10% to 60% by weight of the elastomeric polymer, wherein the hard segment includes a urethane, urea, or urethaneurea; and (2) a soft segment in the amount of 40% to 90% by weight of the elastomeric polymer, wherein the soft segment includes a polyisobutylene macrodiol and/or diamine. Additionally disclosed is a method of forming a polyisobutylene-based thermoplastic urethane, comprising the steps of (a) reacting a polyisobutylene macrodiol and/or diamine with a diisocyanate to form a first reaction mixture; (b) combining a metal catalyst and a chain extender with the first reaction mixture to create a second reaction mixture, a molar ratio of the metal catalyst to the diisocyanate being greater than 0.0:1 and less than or equal to 0.4:1; and (c) reacting the second reaction mixture for a period of time sufficient to form the polyisobutylene-based thermoplastic urethane.

28 Claims, 7 Drawing Sheets

Related U.S. Application Data

(60) Provisional application No. 61/819,285, filed on May 3, 2013, provisional application No. 61/729,124, filed on Nov. 21, 2012.

(51) Int. Cl.
*C08G 18/65* (2006.01)
*C08G 18/10* (2006.01)

(56) References Cited

U.S. PATENT DOCUMENTS

| | | |
|---|---|---|
| 3,328,372 A | 6/1967 | Thomas et al. |
| 3,427,366 A | 2/1969 | Verdol et al. |
| 3,505,252 A | 4/1970 | Brotherton et al. |
| 3,642,964 A | 2/1972 | Rausch et al. |
| 3,755,265 A | 8/1973 | Fletcher et al. |
| 3,815,611 A | 6/1974 | Denniston, III |
| 4,043,331 A | 8/1977 | Martin et al. |
| 4,103,079 A | 7/1978 | Thaler |
| 4,118,427 A | 10/1978 | Rhein et al. |
| 4,154,913 A | 5/1979 | Hergenrother et al. |
| 4,157,429 A | 6/1979 | Hergenrother et al. |
| 4,157,430 A | 6/1979 | Hergenrother et al. |
| 4,276,394 A | 6/1981 | Kennedy et al. |
| 4,316,973 A | 2/1982 | Kennedy |
| 4,342,849 A | 8/1982 | Kennedy |
| 4,352,359 A | 10/1982 | Larimore et al. |
| 4,423,185 A | 12/1983 | Matsumoto et al. |
| 4,477,604 A | 10/1984 | Oechsle, III |
| 4,484,586 A | 11/1984 | McMickle et al. |
| 4,486,572 A | 12/1984 | Kennedy |
| 4,539,996 A | 9/1985 | Engel |
| 4,570,270 A | 2/1986 | Oechsle, III |
| 4,675,361 A | 6/1987 | Ward |
| 4,686,137 A | 8/1987 | Ward, Jr. et al. |
| 4,752,626 A | 6/1988 | Hoye et al. |
| 4,767,885 A | 8/1988 | Kennedy |
| 4,771,082 A | 9/1988 | Solodovnik et al. |
| 4,861,830 A | 8/1989 | Ward |
| 4,880,883 A | 11/1989 | Grasel et al. |
| 4,888,389 A | 12/1989 | Kennedy et al. |
| 4,906,673 A | 3/1990 | Mori |
| 4,910,321 A | 3/1990 | Kennedy et al. |
| 4,928,689 A | 5/1990 | Hauser |
| 4,939,184 A | 7/1990 | Kennedy |
| 5,000,875 A | 3/1991 | Kolouch |
| 5,017,664 A | 5/1991 | Grasel et al. |
| 5,026,814 A | 6/1991 | Re et al. |
| 5,029,585 A | 7/1991 | Lieber et al. |
| 5,090,422 A | 2/1992 | Dahl et al. |
| 5,103,837 A | 4/1992 | Weidlich et al. |
| 5,120,813 A | 6/1992 | Ward |
| 5,129,404 A | 7/1992 | Spehr et al. |
| 5,149,739 A | 9/1992 | Lee |
| 5,152,299 A | 10/1992 | Soukup |
| 5,171,760 A | 12/1992 | Kaszas et al. |
| 5,194,505 A | 3/1993 | Brugel |
| 5,212,248 A | 5/1993 | Knoll et al. |
| 5,269,810 A | 12/1993 | Hull et al. |
| 5,282,844 A | 2/1994 | Stokes et al. |
| 5,322,520 A | 6/1994 | Milder |
| 5,324,324 A | 6/1994 | Vachon et al. |
| 5,330,520 A | 7/1994 | Maddison et al. |
| 5,332,791 A | 7/1994 | Knoll et al. |
| 5,332,798 A | 7/1994 | Ferreri et al. |
| 5,340,881 A | 8/1994 | Kennedy et al. |
| 5,385,579 A | 1/1995 | Helland |
| 5,428,123 A | 6/1995 | Ward et al. |
| 5,433,730 A | 7/1995 | Alt |
| 5,442,010 A | 8/1995 | Hauenstein et al. |
| 5,442,015 A | 8/1995 | Kennedy et al. |
| 5,476,496 A | 12/1995 | Strandberg et al. |
| 5,554,178 A | 9/1996 | Dahl et al. |
| 5,589,563 A | 12/1996 | Ward et al. |
| 5,609,622 A | 3/1997 | Soukup et al. |
| 5,630,844 A | 5/1997 | Dogan et al. |
| 5,637,647 A | 6/1997 | Faust |
| 5,663,234 A | 9/1997 | Kennedy et al. |
| 5,665,823 A | 9/1997 | Saxena et al. |
| 5,677,386 A | 10/1997 | Faust |
| 5,681,514 A | 10/1997 | Woody |
| 5,741,331 A | 4/1998 | Pinchuk |
| 5,755,762 A | 5/1998 | Bush |
| 5,766,527 A | 6/1998 | Schildgen et al. |
| 5,837,313 A | 11/1998 | Ding et al. |
| 5,849,415 A | 12/1998 | Shalaby et al. |
| 5,852,118 A | 12/1998 | Horrion et al. |
| 5,853,652 A | 12/1998 | Schildgen et al. |
| 5,861,023 A | 1/1999 | Vachon |
| 5,874,484 A | 2/1999 | Dirckx et al. |
| 5,898,057 A | 4/1999 | Chiang et al. |
| 5,902,329 A | 5/1999 | Hoffmann et al. |
| 5,912,302 A | 6/1999 | Gadkari et al. |
| 5,931,862 A | 8/1999 | Carson |
| 5,987,746 A | 11/1999 | Williams |
| 5,991,667 A | 11/1999 | Feith |
| 6,005,051 A | 12/1999 | Kennedy et al. |
| 6,010,715 A | 1/2000 | Wick et al. |
| 6,072,003 A | 6/2000 | Horrion et al. |
| 6,087,454 A | 7/2000 | Vanhaeren et al. |
| 6,093,197 A | 7/2000 | Bakula et al. |
| 6,117,554 A | 9/2000 | Shalaby et al. |
| 6,200,589 B1 | 3/2001 | Kennedy et al. |
| 6,228,945 B1 | 5/2001 | Kennedy et al. |
| 6,236,893 B1 | 5/2001 | Thong |
| 6,242,058 B1 | 6/2001 | Bahadur et al. |
| 6,253,110 B1 | 6/2001 | Brabec et al. |
| 6,256,541 B1 | 7/2001 | Heil et al. |
| 6,284,682 B1 | 9/2001 | Troczynski et al. |
| 6,361,780 B1 | 3/2002 | Ley et al. |
| 6,363,286 B1 | 3/2002 | Zhu et al. |
| 6,365,674 B1 | 4/2002 | Kaufhold et al. |
| 6,426,114 B1 | 7/2002 | Troczynski et al. |
| 6,444,334 B1 | 9/2002 | Doi et al. |
| 6,545,097 B2 | 4/2003 | Pinchuk et al. |
| 6,555,619 B1 | 4/2003 | Kennedy et al. |
| 6,600,956 B2 | 7/2003 | Maschino et al. |
| 6,627,724 B2 | 9/2003 | Meijs et al. |
| 6,709,514 B1 | 3/2004 | Hossainy |
| 6,730,324 B2 | 5/2004 | Troczynski et al. |
| 6,770,325 B2 | 8/2004 | Troczynski et al. |
| 6,808,766 B1 | 10/2004 | Miyama et al. |
| 6,827,881 B2 | 12/2004 | Molnar et al. |
| 6,849,667 B2 | 2/2005 | Haseyama et al. |
| 6,870,024 B2 | 3/2005 | Haubennestel et al. |
| 6,889,092 B2 | 5/2005 | Zhu et al. |
| 6,896,965 B1 | 5/2005 | Hossainy |
| 7,013,182 B1 | 3/2006 | Krishnan |
| 7,065,411 B2 | 6/2006 | Verness |
| 7,101,956 B2 | 9/2006 | Benz et al. |
| 7,105,622 B2 | 9/2006 | Kennedy et al. |
| 7,115,300 B1 | 10/2006 | Hossainy |
| 7,119,138 B1 | 10/2006 | Feeney et al. |
| 7,174,221 B1 | 2/2007 | Chen et al. |
| 7,196,142 B2 | 3/2007 | Kennedy et al. |
| 7,231,259 B2 | 6/2007 | Jenney et al. |
| 7,247,364 B2 | 7/2007 | Hossainy et al. |
| 7,279,175 B2 | 10/2007 | Chen et al. |
| 7,280,875 B1 | 10/2007 | Chitre et al. |
| 7,289,856 B1 | 10/2007 | Karicherla |
| 7,292,890 B2 | 11/2007 | Whitehurst et al. |
| 7,347,751 B2 | 3/2008 | Sweeney et al. |
| 7,358,306 B2 | 4/2008 | Turri et al. |
| D579,758 S | 11/2008 | Tanaka et al. |
| 7,504,052 B2 | 3/2009 | Ehbing et al. |
| 7,553,546 B1 | 6/2009 | Tan |
| 7,617,004 B2 | 11/2009 | Bartels et al. |
| 7,715,922 B1 | 5/2010 | Tan |
| 7,756,589 B2 | 7/2010 | Krishnan |
| 7,881,808 B2 | 2/2011 | Borgaonkar et al. |
| 7,979,142 B2 | 7/2011 | Krishnan |
| 8,163,826 B2 | 4/2012 | Willberg et al. |
| 8,324,290 B2 | 12/2012 | Desai et al. |
| 8,349,123 B2 | 1/2013 | Zhang et al. |

(56) References Cited

U.S. PATENT DOCUMENTS

| | | |
|---|---|---|
| 8,372,468 B2 | 2/2013 | Desai et al. |
| 8,374,704 B2 | 2/2013 | Desai et al. |
| 8,501,831 B2 | 8/2013 | Desai et al. |
| 8,529,934 B2 | 9/2013 | Desai et al. |
| 8,644,952 B2 | 2/2014 | Desai et al. |
| 8,660,663 B2 | 2/2014 | Wolf et al. |
| 8,676,344 B2 | 3/2014 | Desai et al. |
| 8,889,926 B2 | 11/2014 | Kennedy et al. |
| 8,903,507 B2 | 12/2014 | Desai et al. |
| 8,927,660 B2 | 1/2015 | Desai et al. |
| 8,962,785 B2 | 2/2015 | Faust et al. |
| 9,574,043 B2 | 2/2017 | Faust et al. |
| 9,655,720 B2 | 5/2017 | Bluestein et al. |
| 2002/0012694 A1 | 1/2002 | Moo-Young et al. |
| 2002/0022826 A1 | 2/2002 | Reynolds et al. |
| 2002/0138123 A1 | 9/2002 | Casas-Bejar et al. |
| 2003/0031699 A1 | 2/2003 | Van Antwerp |
| 2003/0073961 A1 | 4/2003 | Happ |
| 2003/0093136 A1 | 5/2003 | Osypka et al. |
| 2003/0125499 A1 | 7/2003 | Benz et al. |
| 2003/0204022 A1 | 10/2003 | Kennedy et al. |
| 2004/0037886 A1 | 2/2004 | Hsu |
| 2004/0054210 A1 | 3/2004 | Benz et al. |
| 2004/0059402 A1 | 3/2004 | Soukup et al. |
| 2004/0063805 A1 | 4/2004 | Pacetti et al. |
| 2004/0068036 A1 | 4/2004 | Halladay et al. |
| 2004/0143255 A1 | 7/2004 | Vanney et al. |
| 2004/0175558 A1 | 9/2004 | El-Nounou et al. |
| 2004/0186545 A1 | 9/2004 | Rosero et al. |
| 2004/0193139 A1 | 9/2004 | Armstrong et al. |
| 2004/0198901 A1 | 10/2004 | Graham et al. |
| 2005/0031874 A1 | 2/2005 | Michal et al. |
| 2005/0037050 A1 | 2/2005 | Weber |
| 2005/0060022 A1 | 3/2005 | Felt et al. |
| 2005/0070985 A1 | 3/2005 | Knapp et al. |
| 2005/0079199 A1 | 4/2005 | Heruth et al. |
| 2005/0080470 A1 | 4/2005 | Westlund et al. |
| 2005/0180919 A1 | 8/2005 | Tedeschi |
| 2005/0288476 A1 | 12/2005 | Yilgor et al. |
| 2006/0047083 A1 | 3/2006 | Yilgor et al. |
| 2006/0047098 A1* | 3/2006 | Anna ............ C08G 18/2018 528/44 |
| 2006/0135721 A1 | 6/2006 | Lange |
| 2006/0142503 A1 | 6/2006 | Lang et al. |
| 2006/0235499 A1 | 10/2006 | Heil, Jr. et al. |
| 2006/0264577 A1 | 11/2006 | Faust et al. |
| 2007/0051531 A1 | 3/2007 | Borgaonkar et al. |
| 2007/0093604 A1 | 4/2007 | Kennedy et al. |
| 2007/0106144 A1 | 5/2007 | Squeri |
| 2007/0128246 A1 | 6/2007 | Hossainy et al. |
| 2007/0151531 A1 | 7/2007 | Masaoka et al. |
| 2007/0190104 A1 | 8/2007 | Kamath et al. |
| 2007/0190108 A1 | 8/2007 | Datta et al. |
| 2007/0190319 A1 | 8/2007 | Kalayci |
| 2007/0203302 A1 | 8/2007 | Kennedy et al. |
| 2007/0282411 A1 | 12/2007 | Franz et al. |
| 2008/0008739 A1 | 1/2008 | Hossainy et al. |
| 2008/0009939 A1 | 1/2008 | Gueriguian et al. |
| 2008/0051866 A1 | 2/2008 | Chen et al. |
| 2008/0095918 A1 | 4/2008 | Kleiner et al. |
| 2008/0167423 A1 | 7/2008 | Richards et al. |
| 2008/0167710 A1 | 7/2008 | Dave et al. |
| 2008/0311173 A1 | 12/2008 | Schwarz et al. |
| 2009/0054961 A1 | 2/2009 | Borgaonkar et al. |
| 2009/0187162 A1 | 7/2009 | Ohara et al. |
| 2009/0292094 A1 | 11/2009 | Larichev et al. |
| 2009/0326077 A1 | 12/2009 | Desai et al. |
| 2010/0023104 A1 | 1/2010 | Desai et al. |
| 2010/0025703 A1 | 2/2010 | Towns et al. |
| 2010/0055470 A1 | 3/2010 | Klun et al. |
| 2010/0069578 A1 | 3/2010 | Faust et al. |
| 2010/0075018 A1 | 3/2010 | Desai et al. |
| 2010/0107967 A1 | 5/2010 | Tanaka et al. |
| 2010/0179298 A1 | 7/2010 | Faust et al. |
| 2010/0241204 A1 | 9/2010 | Scheuermann |
| 2010/0241208 A1 | 9/2010 | Pinchuk |
| 2010/0241209 A1 | 9/2010 | Krishnan |
| 2010/0249296 A1 | 9/2010 | Kimura et al. |
| 2010/0267897 A1 | 10/2010 | Kennedy et al. |
| 2011/0045030 A1* | 2/2011 | Desai ............ A61L 27/16 424/400 |
| 2011/0051581 A1 | 3/2011 | Janik et al. |
| 2011/0054580 A1 | 3/2011 | Desai et al. |
| 2011/0054581 A1 | 3/2011 | Desai et al. |
| 2011/0087317 A1 | 4/2011 | Borgaonkar et al. |
| 2011/0152989 A1 | 6/2011 | Tan |
| 2011/0213084 A1 | 9/2011 | Kennedy et al. |
| 2012/0077934 A1 | 3/2012 | Faust et al. |
| 2012/0158107 A1 | 6/2012 | Wolf et al. |
| 2012/0259069 A1 | 10/2012 | Kennedy et al. |
| 2012/0309661 A1 | 12/2012 | Adams et al. |
| 2013/0013040 A1 | 1/2013 | Desai et al. |
| 2013/0041108 A1 | 2/2013 | Kennedy et al. |
| 2013/0041442 A1 | 2/2013 | Arnholt et al. |
| 2013/0079487 A1 | 3/2013 | Faust et al. |
| 2013/0122185 A1 | 5/2013 | Desai et al. |
| 2013/0131765 A1 | 5/2013 | Polkinghorne et al. |
| 2013/0330390 A1 | 12/2013 | Pacetti |
| 2013/0331538 A1 | 12/2013 | Kennedy et al. |
| 2014/0074201 A1 | 3/2014 | Arnholt et al. |
| 2014/0088218 A1 | 3/2014 | Desai et al. |
| 2014/0144580 A1 | 5/2014 | Desai et al. |
| 2014/0194963 A1 | 7/2014 | Desai et al. |
| 2016/0008607 A1 | 1/2016 | Kane et al. |
| 2016/0024340 A1 | 1/2016 | Rukavina |
| 2016/0145362 A1 | 5/2016 | Wettling et al. |
| 2017/0137558 A1 | 5/2017 | Faust et al. |
| 2018/0258196 A1 | 9/2018 | Delaney, Jr. et al. |

FOREIGN PATENT DOCUMENTS

| | | |
|---|---|---|
| CN | 1221430 A | 6/1999 |
| CN | 1248606 A | 4/2006 |
| CN | 102131530 A | 7/2011 |
| CN | 102365308 A | 2/2012 |
| CN | 102712808 A | 10/2012 |
| CN | ZL2010800475975 B | 4/2015 |
| CN | 104602888 A | 5/2015 |
| DE | 19610350 A1 | 9/1997 |
| EP | 0153520 A1 | 9/1985 |
| EP | 0259492 A1 | 3/1988 |
| EP | 0610714 A2 | 8/1994 |
| EP | 0732349 A2 | 9/1996 |
| EP | 0837097 A1 | 4/1998 |
| EP | 1061092 A1 | 12/2000 |
| EP | 1489109 A2 | 12/2004 |
| EP | 2006328 A1 | 12/2008 |
| JP | 0208614 A | 3/1990 |
| JP | 4154815 A | 5/1992 |
| JP | 6345821 A | 12/1994 |
| JP | 7102017 A | 4/1995 |
| JP | 7330591 A | 12/1995 |
| JP | 07331223 A | 12/1995 |
| JP | 1087726 A | 4/1998 |
| JP | 11131325 A | 5/1999 |
| JP | 2000169814 A | 6/2000 |
| JP | 2000264947 A * | 9/2000 |
| JP | 2001011319 A | 1/2001 |
| JP | 2001040064 A | 2/2001 |
| JP | 2001131879 A | 5/2001 |
| JP | 2002348317 A | 12/2002 |
| JP | 2003137951 A | 5/2003 |
| JP | 2004204181 A | 7/2004 |
| JP | 2006515795 A | 6/2006 |
| JP | 2008238761 A | 10/2008 |
| JP | 2009132832 A | 6/2009 |
| JP | 2009535182 A | 10/2009 |
| JP | 2009540873 A | 11/2009 |
| JP | 2011526326 A | 10/2011 |
| JP | 2012515231 A | 7/2012 |
| JP | 2012519053 A | 8/2012 |
| JP | 2013502495 A | 1/2013 |
| JP | 2014533580 A | 12/2014 |
| JP | 2015523192 A | 8/2015 |

(56) References Cited

FOREIGN PATENT DOCUMENTS

| WO | WO1987004625 A1 | 8/1987 |
|---|---|---|
| WO | WO9316131 A1 | 8/1993 |
| WO | WO1993022360 A1 | 11/1993 |
| WO | WO1995026993 A1 | 10/1995 |
| WO | WO1997000293 A1 | 1/1997 |
| WO | WO9707161 A1 | 2/1997 |
| WO | WO1997047664 A1 | 12/1997 |
| WO | WO1998033832 A1 | 8/1998 |
| WO | WO1998034678 A1 | 8/1998 |
| WO | 1999051656 A1 | 10/1999 |
| WO | WO200213785 A2 | 2/2002 |
| WO | WO2003042273 A1 | 5/2003 |
| WO | WO2004014453 A1 | 2/2004 |
| WO | WO2004044012 A1 | 5/2004 |
| WO | WO2004113400 A2 | 12/2004 |
| WO | WO2005035655 A1 | 4/2005 |
| WO | WO2006011647 A1 | 10/2006 |
| WO | WO2006110647 A1 | 10/2006 |
| WO | WO2007030722 A1 | 3/2007 |
| WO | WO2007117566 A2 | 10/2007 |
| WO | WO2007119687 A1 | 10/2007 |
| WO | 2007130900 A2 | 11/2007 |
| WO | WO2007126806 A1 | 11/2007 |
| WO | WO2008060333 A1 | 5/2008 |
| WO | WO2008066914 A1 | 6/2008 |
| WO | WO2008112190 A1 | 9/2008 |
| WO | WO2008127730 A1 | 10/2008 |
| WO | WO2008156806 A1 | 12/2008 |
| WO | WO2009051945 A1 | 4/2009 |
| WO | WO2009058397 A1 | 5/2009 |
| WO | WO2009158600 A1 | 12/2009 |
| WO | WO2009158609 A1 | 12/2009 |
| WO | WO2010039986 A1 | 4/2010 |
| WO | WO2010078552 A1 | 7/2010 |
| WO | WO2010081132 A1 | 7/2010 |
| WO | 2010107530 A2 | 9/2010 |
| WO | WO2010111280 A1 | 9/2010 |
| WO | 2010135418 A2 | 11/2010 |
| WO | WO2011022583 A1 | 2/2011 |
| WO | WO2011060161 A1 | 5/2011 |
| WO | 2012093597 A1 | 7/2012 |
| WO | WO2013192186 A1 | 12/2013 |
| WO | 2014018509 A1 | 1/2014 |
| WO | WO2015007553 A1 | 1/2015 |

OTHER PUBLICATIONS

Ako, Masayuke et al., "Polyisobutylene-based urethane foams I. Comparative reactivities of hydroxyl-terminated polyisobutylene-diols and -triols and other hydroxyl-capped polyols with isocyanate", Polymer Bulletin 19(2), 137-143 (1988).

Ako, Masayuke et al., "Polyisobutylene-based urethane foams II. Synthesis and properties of novel poiyisobutylene-based flexible polyurethane foams", Journal of Applied Polymer Science, vol. 37(5), Feb. 5, 1989, pp. 1351-1361.

Bacaloglu, R. and Cotarca, L. "Reactions of Aryl Isocyanates with Alcohols in the Presence Ob Tertiary Amines." Journal f. prakt. Chemie. , 330(4):530-540.

Bela et al., Living Carbocation Polymerization. XX. Synthesis of Allyl-Telechelic Polyisobutylenes by One-Pot Polymerization-Functionalization polymer. Mater. Sci. Eng. 1988; 58:869-872.

Chang, Victor S.C. et al. "Gas Permeability, Water Absorption, Hydrolytic Stability and Air-Oven Aging of Polyisobutylene-Based Polyurethane Networks", Polymer Bulletin 8(2-3-4), 69-74 (1982).

Chen, Chi-Chang et al., "Solid Polymer Electrolytes III Preparation, Characterization, arid Ionic Conductivity of New Gelled Polymer Electrolytes Based on Segmented, Perfluoropolyether-Modified Polyurethane", Journal of Polymer Science: Part A: Polymer Chemistry, vol. 40, pp. 486-495 (2002).

Chen, D., et. al. Amphiphilic Networks: 11. Biocompatibility and Controlled Drug Release of Poly[Isobutylene-co-2-(dimethylamino)Ethyl Methacrylate]. J. of Biomedical Materials Research, 23:1327-1342, 1989.

Chen, T. K., et. al. Glass Transition Behaviors of a Polyurethane Hard Segment based on 4, 4'- Diisovyanatodiphenylmethane and 1,4-Butanediol and the Calculation of Microdomain Composition. Macromolecules, 30:5068-5074, 1997.

Cho, J. C., et. al. Synthesis, Characterization, Properties, and Drug Release of Poly(Alkyl Methacrylate-B-Isobutylene-B-Alkyl Methacrylate). Biomacromolecules, 7:2997-3007, 2006.

Choi, T., et. al. Segmented Polyurethanes Derived from Novel Siloxane—Carbonate Soft Segments for Biomedical Applications. Journal of Polymer Science Part B: Polymer Physics, 49:865-872, 2011.

Christenson, E. M., et. al. Oxidative Mechanisms of Poly(Carbonate Urethane) and Poly(Ether Urethane) Biodegradation: In Vivo and In Vitro Correlations. J. Biomed. Mater. Res., 70A:245-255, 2004.

Communication in Cases for which No Other Form is Applicable, issued in PCT/US2013/053448, dated Jul. 28, 2014, 1 page.

Cozzens, David et al. Long Term in Vitro Biostability of Segmented Polyisobutylene-Based Thermoplastic Polyurethanes. Journal of Biomedicals Materials Research Journal, Part A, 774-782, 2010.

De, Priyadarsi et al., "Carbocationic Polymerization of Isobutylene Using Methylaluminum Bromide Coinitiators: Synthesis of Bromoally Functional Polyisobutylene" Macromolecules, Oct. 2006, 39(2), 7527-7533.

De, Priyadarsi et al., "Relative Reactivity of C4 Olefins toward the Polyisobutylene Cation" Macromolecules 2006, 39, 6861-6870.

Erdodi, G., et al., "Polyisobutylene-Based Polyurethanes. III. Polyurethanes Containing PIB/PTMO Soft Co-Segments," J. Polym. Sci., Part A: Polym. Chem, 47:5278-5290 (2009).

Erdodi, G., et al., "Polyisobutylene-Based Polyurethanes. VI. Unprecedented Combination of Mechanical Properties and Oxidative/Hydrolytic Stability by H-Bond Acceptor Chain Extenders" J. Polym. Sci., Part A: Polym. Chem, 48:2361-2371 (2010).

Examination Report and Search Report for Chinese Application No. 201380042582.3, dated Dec. 4, 2015, consisting of 6 pages.

Extended European Search Report issued in EP appln. 16206626.0, dated Apr. 25, 2017, 8 pages.

Fan, L., et. al. The Absolute Calibration of a Small-Angle Scattering Instrument with a Laboratory X-ray Source. XIV International Conference on Small-Angle Scattering (SAS09), Journal of Physics: Conference Series 247, 11 pages, 2010.

Faust, R. et al., "Method to Prepare Block Copolymers by the Combination of Cationic and Anionic Polymerization", U.S. Appl. No. 12/225,905, filed Apr. 5, 2007.

Gadkari A. et al., "Preparation and biocompatibility of Novel Polar-Nonpolar Networks. Osynthesis, Characterization and Histological-Bacterial Analysis of Mixed Polytetrahydrofuran-Polyisobutylene Networks", Polymer Bulletin, vol. 22, No. 1, Jul. 1, 1989, pp. 25-32.

Giusti, Paolo et al., "Synthesis and Characterization of New potentially Hemocompatible Thermoplastic Elastomers", p. 371, Abstract.

Gunatillake, P. A., et. al. Synthesis and Characterization of a Series of Poly(alkylene carbonate) Macrodiols and the Effect of Their Structure on the Properties of Polyurethanes. Journal of Applied Polymer Science, 69:1621-1633, 1998.

Gunatillake, P.A. et al., "Poly(dimethylsiloxane)/Poly(hexamethylene oxide) Mixed Macrodiol Based Polyurethane Elastomers. I. Synthesis and Properties", Journal of Appl. Polym. Sci. 2000, 76, 2026-2040, © 2000.

Gyor, M., et. al. Living Carbocationic Polymerization of Isobutylene with Blocked Bifunctional Initiators in the Presence of Di-tert-butylpyridine as a Proton Trap. J. of Macromolecular Science, Part A, Pure Appl. Chem., 29(8):639-653, 1992.

Hansen, Charles M. Hansen Solubility Parameters: A User's Handbook, 2nd ed. New York, CRC Press, Taylor & Francis Group, 2007, 546 pages.

Hernandez, et. al. R. Microstructural Organization of Three-Phase Polydimethylsiloxane-Based Segmented Polyurethanes. Macromolecules, 40:5441-5449, 2007.

Hernandez, R., et. al. A Comparison of Phase Organization of Model Segmented Polyurethanes with Different Intersegment Compatibilities. Macromolecules, 41:9767-9776, 2008.

(56) References Cited

OTHER PUBLICATIONS

Higashihara, T. et al., "Synthesis of Poly(isobutylene-block-methyl methacrylate) by a Novel Coupling Approach", Macromolecules, 39:5275-5279 (2006).
International Preliminary Report on Patentability and Written Opinion dated May 26, 2015 for International Application No. PCT/US2013/071170, entitled "High Strength Polyisobutylene Polyurethanes".
International Preliminary Report on Patentability issued in PCT/US2016/027294, dated Nov. 2, 2017, 7 pages.
International Preliminary Report on Patentability, Chapter II, issued in PCT/US2006/035064, dated Sep. 12, 2007, 12 pages.
International Search Report and Written Opinion issued in PCT/US2006/013308, dated Aug. 25, 2006.
International Search Report and Written Opinion issued in PCT/US2006/035064, dated Jan. 23, 2007, 12 pages.
International Search Report and Written Opinion issued in PCT/US2007/007558, dated Sep. 20, 2007.
International Search Report and Written Opinion issued in PCT/US2007/008528, dated Oct. 2, 2007.
International Search Report and Written Opinion issued in PCT/US2007/012948, dated Nov. 28, 2007.
International Search Report and Written Opinion issued in PCT/US2010/028334, dated May 6, 2010, 12 pages.
International Search Report and Written Opinion issued in PCT/US2010/046072, dated Oct. 15, 2010, 10 pages.
International Search Report and Written Opinion issued in PCT/US2010/047633, dated Jun. 17, 2011, 12 pages.
International Search Report and Written Opinion issued in PCT/US2010/047703, dated Jun. 17, 2011, 12 pages.
International Search Report and Written Opinion issued in PCT/US2011/061692, dated Feb. 9, 2012, 9 pages.
International Search Report and Written Opinion issued in PCT/US2013/053448, dated Apr. 28, 2014, 11 pgs.
International Search Report and Written Opinion issued in PCT/US2013/053448, dated Jul. 28, 2014, correcting earlier version dated Apr. 28, 2014, 11 pages.
International Search Report and Written Opinion issued in PCT/US2016/027294 dated Jul. 28, 2016, 10 pages.
International Search Report and Written Opinion issued in PCT/US2016/067363, dated Mar. 3, 2017, 10 pages.
Claiborne, T. E., Slepian, M. J., Hossainy, S., & Bluestein, D. (2013). Polymeric trileaflet prosthetic heart valves: evolution and path to clinical reality. Expert Rev Med Devices., 9(6):577-594.
Fischer, Stefan; et al. "Synthesis and Biological Evaluation of Bromo- and Fluorodanicalipin A." Angew. Chem. Int. Ed. 2016, 55, 2555-2558.
Georgiou, Theoni K; et al. "Amphiphilic Model Conetworks of Polyisobutylene Methacrylate and 2-(Dimethylamino) ethyl Methacrylate Prepared by the Combination of Quasiliving Carbocationic and Group Transfer Polymerizations." Macromolecules 2007, 40, 2335-2343.
H. Mach and P. Rath. "Highly Reactive Polyisobutene as a Component of a New Generation of Lubricant and Fuel Additives," Lubrication Science 11-2, Feb. 1999, pp. 175-185.
International Preliminary Report on Patentability issued in PCT/US2016/067363, dated Jun. 28, 2018, 7 pages.
International Preliminary Report on Patentability issued in PCT/US2017/031856, 7 pages.
International Search Report and Written Opinion issued in PCT/US2018/021311, dated May 24, 2018, 11 pages.
International Search Report and Written Opinion issued in PCT/US2018/046813, dated Dec. 11, 2018, 11 pages.
Ivan, Bela; et al. "Living Carbocationic Polymerization. XXX. One-Pot Synthesis of Allyl-Terminated Linear and Tri-Arm Star Polyisobutylenes, and Epoxy- and Hydroxy-Telechelics Therefrom." Journal of Polymer Science: Part A: Polymer Chemistry, vol. 28, 89-104 (1990).
Kabalka, George W.; et al. "N-t-Butoxycarbonyl Protection of Primary and Secondary Amines in the Hydroboration Reaction: Synthesis of Amino Alcohols." Synthetic Communications: An International Journal for Rapid Communication of Synthetic Organic Chemistry, 25(14), 2135-2143 (1995).
Kali, Gergely; et al. "Anionic Amphiphilic End-Linked Conetworks by the Combination of Quasiliving Carbocationic and Group Transfer Polymerizations." Journal of Polymer Science, Part A—Polymer Chemistry, 2009, 47(17):4289-4301.
Lazzarato, Loretta; et al. "(Nitrooxyacyloxy)methyl Esters of Aspirin as Novel Nitric Oxide Releasing Aspirins." J. Med. Chem. 2009, 52, 5058-5068.
Motte, S., & Kaufman, L. J. (2012). Strain stiffening in collagen I Networks. Biopolymers, 99(1):35-46.
Prucker, O., et al. Photochemical Attachment of Polymer Films to Solid Surfaces via Monolayers of Benzophenone Derivatives. J. Am. Chem. Soc. 121:8766-8770, 1999.
Singh, Vishwakarma; et al. "Molecular complexity from aromatics. Cycloaddition of spiroepoxycyclohexa-2,4-dienones and intramolecular Diels-Alder reaction: a stereoselective entry into tetracyclic core of atisane diterpenoids." Tetrahedron 69 (2013) 137-146.
Storey, Robson F.; et al. "Carbocation Rearrangement in Controlled/Living Isobutylene Polymerization," Macromolecules 1998, 31, pp. 1058-1063.
Weiss, H. G.; et al. "Diborane from the Sodium Borohydride-Sulfuric Acid Reaction." Contribution From Research Laboratory, Olin Mathieson Chemical Corporation, Dec. 5, 1959, 81(23):6167-6168.
International Search Report and Written Opinion issued in PCT/US2017/031856, dated Aug. 11, 2017, 9 pages.
International Search Report issued in PCT/US2009/048827, dated Oct. 6, 2009, 3 pages.
International Search Report issued in PCT/US2009/048845 dated Oct. 6, 2009, 3 pages.
International Search Report issued in PCT/US2010/020733, dated May 6, 2010.
Ioffe, David et al., "Bromine, Organic Compounds", Kirk-Othmer Encyclopedia of Chemical Technology, vol. 4, pp. 340-365, © 2002.
Ivan, B. et al., "Synthesis of New Polyisobutylene-Based Polyurethanes", Am. Chem. Soc., Div. Org. Coat. Plast. Prepr., 43, 908-913 (1980).
Ivan, B., et. al. Living Carbocationic Polymerization. XXX. One-Pot Synthesis of Allyl-Terminated Linear and Tri-Arm Star Polyisobutylenes, and Epoxy- and Polyisobutylenes, and Epoxy- and Hydroxy-Telechelics Therefrom. Journal of Polymer Science: Part A: Polymer Chemistry, 28:89-104, 1990.
Ivan, Bela, et. al. New Telecheiic Polymers and Sequential Copolymers by Polyfunctional Initiator-Transfer Agents (Inifers). VII. Synthesis and Characterization of alpha,omega-Di(hydroxy) Polyisobutylene. Journal of Polymer Science: Polymer Chemistry Edition, 18:3177-3191, 1980.
Jenny, C. et al., "A New Insulation Material for Cardiac Leads with Potential for Improved performance", HRS 2005, HeartRhythm, 2, S318-S319 (2005).
Jewrajka, Suresh K. et al., "Polyisobutylene-Based Polyurethanes. II. Polyureas Containing Mixed PIB/PTMO Soft Segments", Journal of Polymer Science: Part A: Polymer Chemistry, vol. 47, 2787-2797 (2009).
Jewrajka, Suresh K. et al., "Polyisobutylene-Based Segmented Polyureas. I. Synthesis of Hydrolytically and Oxidatively Stable Polyureas", Journal of Polymer Science: Part A: Polymer Chemistry, vol. 47, 38-48 (2009).
Kang, Jungmee et al, "PIB-Based Polyurethanes. IV. The Morphology of Polyurethanes Containing Soft Co-Segments", Journal of Polymer Science Part A: Polymer Chemistry, vol. 47, 6180-6190 (2009).
Kang, Jungmee et al., "Rendering Polyureas Melt Processible", Journal of Polymer Science Part A: Polymer Chemistry, vol. 49, 2461-2467 (2011).
Kang, Jungmee et al., Polyisobutylene-Based Polyurethanes. V. Oxidative-Hydrolytic Stability and Biocompatibility, Journal of Polymer Science: Part A: Polymer Chemistry, vol. 48, 2194-2203 (2010).

(56) References Cited

OTHER PUBLICATIONS

Kang, Jungmee, et al. Polyisobutylene-Based Polyurethanes with Unprecedented Properties and How They Came About. Polymer Chemistry, 49:3891-3904.

Kennedy, J.P. et al., "Designed Polymers by Carbocationic Macromolecular Engineering: Theory and practice", Hanser Publishers 1991, pp. 191-193 and 226-233.

Kennedy, J.P. et al., "Polyisobutylene-Based Diols and Polyurethanes", Urethane Chemistry and Applications, Ed., K. H. Edwards, ACS Symp. Book Series, 172, Washington, D.C. 1981, pp. 383-391.

Kennedy, J.P. et al., "Polyisobutylene-Based Diols and Polyurethanes" Advances in Urethane Science and Technology, vol. 8, 1981, pp. 245-251.

Kennedy, J.P. et al., "Polyisobutylene-based Model urethane Networks, I. Initial characterization and Physical properties", Polymeric Materials Science and Engineering, vol. 49, Copyright 1983 by ACS, pp. 69-77.

Kennedy, Joseph P. Synthesis, Characterization and Properties of Novel Polyisobutylene-Based urethane Model Networks, Journal of Applied Polymer Science, vol. 33(7), May 20, 1987, pp. 2449-2465.

Kennedy, Joseph P. "Synthesis, Characterization and Properties of Polyisobutylene-Based Polyurethanes", 6th International Technical/Marketing Conference: Polyurethane-New Paths to Progress-Marketing—Technology, Journal of Cellular Plastics, 1983, 19:288-307.

Kennedy, Joseph P. "Synthesis, Characterization and Properties of Polyisobutylene-Based Polyurethanes", Journal of Elastomers and Plastics, vol. 17 (Jan. 1985), pp. 82-88.

Kennedy, Joseph P. "Synthesis, Characterization and Properties of Polyisobutylene-Based Polyurethanes", The Society of the Plastics Industry, Inc., polyurethane Division, Proceedings of the SPI—6th International Technical/Marketing Conference, Nov. 2-4 1983, San Diego, CA, pp. 514-516.

Kennedy, Joseph P., "Polyurethanes Based on Polyisobutylenes", Cherntech, Nov. 1986, 16(11), pp. 694-697.

Kirby, Darren, "Use of a Bioactive Material on a Pacemaker Electrode for the Purpose of Enhancing Heart Pace/Sense Efficiency", MSC Biomedical Engineering, Thesis, Trinity College Dublin (2003).

Koberstein, J. T., et. al. Compression-Molded Polyurethane Block Copolymers. 1. Microdomain Morphology and Thermornechanical Properties, Macromolecules, 25:6195-6204, 1992.

Koberstein, J. T., et. al. Compression-Molded Polyurethane Block Copolymers. 2. Evaluation of Microphase Compositions. Macromolecules, 25:6205-6213, 1992.

Koberstein, J. T., et. al. Simultaneous SAXS-DSC Study of Multiple Endothermic Behavior in Polyether-Based Polyurethane Block Copolymers. Macromolecules, 19:714-720, 1986.

Kunal, K., et. al. Polyisobutylene: A Most Unusual Polymer. Journal of Polymer Science: Part B: Polymer Physics, 46:1390-1399 2006.

Lelah, M.D. et al., "Polyurethanes in Medicine", CRC Press, Boca Raton, FL 1986, Chapter 3.

Leung, L. M., et. al. DSC Annealing Study of Microphase Separation and Multiple Endothermic Behavior in Polyether-Based Polyurethane Block Copolymers. Macromolecules, 19:706-713, 1986.

Li, J. et al., "Polyisobutylene supports—a non-polar hydrocarbon analog of PEG supports", Tetrahedron, 61(51):12081-12092, Dec. 2005.

Macias, A. et al., "Preparacion y reticulacion de poliisobutilenos de bajo peso molecular con grupos terminales reactivos", Revista de Plasticos Modernos, Num 332 (Apr. 1983), pp. 412-418.

Martin, D. J., et. al. Polydimethylsiloxane/Polyether-Mixed Macrodiol-Based Polyurethane Elastomers: Biostability. Biomaterials, 21:1021-1029, 2000.

Miller, J. A., "New Directions in Polyurethane Research", Organic Coatings and Applied Polymer Science Proceedings, vol. 47, Copyright 1982 by ACS, pp. 124-129.

Mitzner, E. et al., "Modification of poly(ether urethane) elastomers by incorporation of poly(isobutylene) glycol. Relation between polymer properties and thrombogenicity", J. Biomater. Sci. Polymer edn. vol. 7, No. 12, pp. 1105-1118 (1996).

Mitzner, E., "Modification of segmented poly(ether urethanes) by incorporation of Poly(isobutylene)glycol", J.M.S.—Pure Appl. Chem., A34(1), pp. 165-178 (1997)

Mitzner, E et, al. Modification of Segmented Poly(Ether Urethanes) by incorporation of Poly(Isobutylene)Glycol. Journal of Macromolecular Science, Part A., Pure and Applied Chemistry, 34(1):165-178, 1997.

Miyabayashi, Toshio et al., "Characterization of Polyisobutylene-Based Model Urethane Networks", Journal of Applied Polymer Science, vol. 31, pp. 2523-2532 (1986).

Muller, J.P. et al., "Surface modification of polyurethanes by multicomponent polyaddition reaction", Journal of Materials Science Letters 17(2), 1998, pp. 115-118.

Non-Final Office Action issued in U.S. Appl. No. 11/400,059, dated Apr. 11, 2011.

Non-Final Office Action issued in U.S. Appl. No. 12/492,483, dated Nov. 21, 2011, 11 pages.

Non-Final Office Action, issued in U.S. Appl. No. 12/685,858, dated Feb. 15, 2012, 18 pages.

Notice of Allowance issued in U.S. Appl. No. 12/492,483, dated Jul. 13, 2012, 9 pages.

Notification of Transmittal of the International Search Report and the Written Opinion of the International Searching Authority for Int'l Application No. PCT/US2013/071170, entitled: High Strength Polyisobutylene Polyurethanes, dated Jun. 6, 2014.

Odian, G. "Principles of Polymerization," Wiley Interscience (2004), pp. 80-83.

Office Action issued in EP 07754128 dated Mar. 31, 2010.

Office Action issued in EP Application No. 07754128.2, dated Feb. 19, 2009, 3 pages.

Office Action issued in U.S. Appl. No. 11/400,059, dated Aug. 24, 2010.

Ojha et al., "Synthesis and Characterization of Thermoplastic Polyurethaneureas based on Polyisobutylene and Poly (tetramethylene oxide) Segments", J. Macromolecular Science, Part A, vol. 47(3), pp. 186-191, Mar. 2010.

Ojha, Umaprasana et al., "Syntheses and characterization of novel biostabie polyisobutylene based thermoplastic polyurethanes", Polymer 50(2009), 3448-3457.

Ojha, Umaprasana et al., "Synthesis and Characterization of Endfunctionalized Polyisobutylenes for Sharpless-type Click Reactions", Polymer Preprints 2007, 48(2), 786.

Ojha, Umaprasana, et al. Syntheses and Characterization of Novel Biostable Polyisobutylene Based Thermoplastic Polyurethanes. Polymer 50:3448-3457, 2009.

Pinchuk, L. Review: A Review of the Biostability and Carcinogenicity of Polyurethanes in Medicine and the New Generation of 'Biostable' Polyurethanes. J. Biomater. Sci., Polymer Edn., 6(3):225-267, 1994.

Puskas, J.E. et al., "polyisobutylene-based biomateriais", Journal of Polymer Science Part A: Polymer Chemistry, vol. 42, Issue 13 (2004) pp. 3091-3109.

Rajkhowa, Ritimoni et al., "Efficient syntheses of hydroxyallyl end functional polyisobutylenes, a precursors to thermoplastic polyurethanes", Polymer Reprints (American Chemical Society, Division of Polymer Chemistry) 2007, 48 (2), 233-234.

Ranade, S. et al., "Physcal characterization of controlled release of paclitaxel from the TAXUS™ Express2™ drug-eluting stent", Journal of Biomedical Materials Research Part A, 71A (2004) 625-634.

Ranade, S.V. et al., Styrenic Block copolymers for Biomaterial and Drug Delivery Applications, Acta Biomater, Jan. 2005; 1(1): 137-44.

Response filed Aug. 31, 2009 to Office Action dated Feb. 19, 2009, EP App 07754128.

Saiani, A., et. al. Origin of Multiple Melting Endotherms in a High Hard Block Content Polyurethane. 1. Thermodynamic Investigation, Macromolecules, 34:9059-9068, 2001.

Salani, A., et. al. Origin of Multiple Melting Endotherms in a High Hard Block ContentPolyurethane, 2. Structural Investigation, Macromolecules, 37:1411-1421, 2004.

(56) References Cited

OTHER PUBLICATIONS

Santos, R. et al., "New Telechelic Polymers and Sequential Copolymers by Polyfunctional Initiator-Transfer-Agents (Inifers)", Polymer Bulletin, 11:341-348 (1984).
Schellekens, Yves, et al., "Tin-Free Catalysts for Production of Aliphatic Thermoplastic Polyurethanes." Green Chemistry, 16:4401-4407, 2014.
Second Office Action for Chinese Application No. 201380042582.3, entitled "High Strength Polyisobutylene Polyurethanes" dated May 10, 2016 consisting of 5 pages.
Siefken, Von Werner. "Mono- und Polyisocyanate, IV, Mitteilung uber Polyurethane," [With machine English translation]. Justus Liebigs Annalen Der Chemie, 562(2):75-136, 1949.
Simmons, Anne. et al., "The effect of sterilisation on a poly(dimethylsiloxane)/poly(hexamethylene oxide) mixed macrodiol-based Polyurethane elastomer", Biomaterials 2006, 27, 4484-4497.
Six, Christian, et al. "Isocyanates, Organic." Ullmann's Encyclopedia of Industrial Chemistry, vol. 20:63-82, 2012.
Speckhard; T. A., et. al. Properties of Polyisobutylene Polyurethane Block Copolymers: 2. Macroglycols Produced by the "Inifer" Technique, Polymer, 26:55-69, 1985.
Speckhard; T.A, et al., "New generation polyurethanes", Polymer News 1984, 9(12), 354-358.
Speckhard, T.A. et al., "Properties of Polyisobutylene Polyurethane Block Copolymers: 2. Macroglycols produced by the 'inifer' technique", Polymer, vol. 26, No. 1, Jan. 1985, pp. 55-78.
Speckhard, T.A. et al., "Properties of Polyisobutylene Polyurethane Block Copolymers: 3. hard segments based on 4,4'-dicyclohexylmethane diisocyanate (H12MDI) and butane diol", Polymer, vol. 26, No. 1, Jan. 1985, pp. 70-78.
Speckhard, T.A. et al., "Properties of Polyisobutylene-Polyurethane Block Copolymers", Journal of Elastomers and Plastics, vol. 15 (Jul. 1983), pp. 183-192.
Speckhard, T.A. et al., "Properties of Polyisobutylene-Polyurethane Block Copolymers: I. Macroglycols from Ozonolysis of Isobutylene-Isoprene Copolymer", Polymer Engineering and Science, Apr. 1983, vol. 23. No, 6, pp. 337-349.
Speckhard, T.A. et al., "Ultimate Tensite Properties of Segmented Polyurethane Elastomers", Rubber Chem. Technol., 59, 405-431 (1986).
Stokes, K., et. al. Polyurethane Elastomer Biostability. Journal of Biomaterials Applications, 9:321-354, 1995.
Tan, J. et al., "In Vivo Biostability Study of a New Lead Insulation Material," Cardiostim 2006, Europace Supplements, 8, 179PW/9 (2006).
Third Office Action for Chinese Application No. 201380042582.3, entitled "High Strength Polyisobutylene Polyurethanes" dated Jul. 27, 2016 consisting of 5 pages.
Tonelli, C. et al., "New Fluoro-Modified Thermoplastic Polyurethanes" Journal of Applied Polymer Science, vol. 87, Issue 14 (2003) 2279-2294.
Tonelli, Claudio et al., "New Perfluoropolyether Soft Segment Containing Polyurethanes", Journal of Applied Polymer Science, vol. 57, pp. 1031-1042 (1995).
Virmani, R. et al. Circulation Feb. 17, 2004, 109)6) 701-5.
Viski, Peter, et al. "A Novel Procedure for the Cleavage of Olefin Derivatives to Aldehydes Using Potassium Permanganate." J. Org. Chem., 51:3213-3214, 1986.
Wang, F. Polydimethylsiloxane Modification of Segmented Thermoplastic Polyurethanes and Polyureas, PhD. Dissertation, Virginia Polytechnic Institute and State university, Apr. 13, 1996.
Weisberg, David M. et al., "Synthesis and Characterization of Amphiphilic Poly(urethaneurea)-comb-polyisobutylene Copolymers", Macromolecules 2000, 33(12), pp. 4380-4389.
Weissmuller, M. et al., "Preparation and end-linking of hydroxyl-terminated polystyrene star macromolecules", Macromolecular Chemistry and Physics 200(3), 1999, 541-551.
Wiggins, Michael J. et al., "Effect of soft-segment chemistry on polyurethane biostability during in vitro fatigue loading", Journal of biomedical materials research, 68(4), 2004, 668-683.
Wohlfarth, C., "Permittivity (Dielectric Constant) of Liquids", CRC Handbook, 91st ed. 2010-2011, p. 6-186 to 6-207.
Wright, James I., "Using Polyurethanes in Medical Applications", 5 pages. Downloaded from http://www.cmdm.com on Oct. 17, 2006.
Wu, Yuguang et al., "The role of adsorbed fibrinogen in platelet adhesion to polyurethane surfaces: A comparison of surface hydrophobicity, protein adsorption, monoclonal antibody binding, and platelet adhesion", Journal of Biomedical Materials Research, Part A, Sep. 15, 2005, vol. 74A, No. 4, pp. 722-738.
Xu, Ruijian et al., "Low permeability biomedical polyurethane nanocomposites", Journal of Miomedical Materials Resarch, 2003, vol. 64A, pp. 114-119.
Yang, M. et al., J. biomed. Mater. Res. 48 (1999) 13-23.
Yeh, J. et al., "Moisture diffusivity of Biomer® versus Biomer®-coated Polyisobutylene polyurethane urea (PIB-PUU): a potential blood sac material for the artificial heart", Journal of Materials Science Letters 13(19), 1994, pp. 1390-1391.
Yoon, Sung C. et al., "Surface and bulk structure of segmented poly(ether urethanes) with Perfluoro Chain Extenders. 5. Incorporation of Poly(dimethylsiloxane) and Polyisobutylene Macroglycols", Macromolecules Mar. 14, 1994, 27(6), pp. 1548-1554.
York, P., "New Materials and Systems for Drug Delivery and Targeting", Chemical Aspects of Drug Delivery Systems, Copyright 1996, pp. 1-10, proceedings from a symposium held Apr. 17-18, 1996 at Salford University.
Zhang, F., et. al, Glassy Carbon as an Absolute Intensity Calibration Standard for Small-Angle Scattering. Metallurgical and Materials Transactions A, 41A:1151-1158, May 2010.

* cited by examiner

Lower catalyst concentrations

Higher catalyst concentrations

PIB

————————

MDI+BDO

HIGH STRENGTH POLYISOBUTYLENE POLYURETHANES

RELATED APPLICATIONS

This application is a divisional of U.S. application Ser. No. 14/433,974, filed on Apr. 7, 2015, which is the U.S. National Stage of International Application No. PCT/US2013/071170, filed Nov. 21, 2013, which designates the U.S., published in English, which claims the benefit of U.S. Provisional Application No. 61/729,124, filed Nov. 21, 2012; and U.S. Provisional Application 61/819,285, filed May 3, 2013. The entire teachings of the above applications are incorporated herein by reference.

BACKGROUND OF THE INVENTION

Thermoplastic polyurethanes, polyureas, and polyurethaneureas represent an important family of segmented block copolymer thermoplastic elastomers. They can be extruded, injection or compression molded, or solution spun. They offer a broad range of physical properties and characteristics, including high tensile and tear strength, chemical and abrasion resistance, good processability, and protective barrier properties. Polyurethanes are the most commonly used materials in the production of biomedical devices that come in contact with blood such as pacemakers, defibrillators, angioplasty balloons, surgical drains, dialysis devices, etc.

Depending on composition, i.e. on the volume fraction of the soft, elastomeric segments, these polymers can be soft and rubbery, or hard and rigid materials. The hard segments of polyurethanes or polyureas are composed of diisocyanate and a small molecule diol or diamine chain extender. These hard segments may comprise, for example, diamines and a combination of diols and diamines, respectively, in addition to diisocyanate. The soft segments are mostly low molecular weight polymeric diols, which may include polyester diols, polyether diols, and polydiene diols.

Polyurethanes that incorporate a polyether diol into the soft segment generally suffer long-term in vivo bioinstability due to oxidation of the polyether soft segment, especially when in contact with metals, which catalyze oxidative degradation. This deficiency limits the use of polyurethanes for long-term applications.

Polyisobutylene (PIB)-based thermoplastic polyurethanes (TPUs) offer high thermal, oxidative, and hydrolytic stability, but exhibit insufficient mechanical properties without the addition of a polyether or polyester diol. The need for a PIB-based TPU that exhibits sufficient mechanical properties and biostability is still present.

SUMMARY OF THE INVENTION

It has now been discovered that the mechanical properties of PIB-based TPUs are highly affected by the catalyst concentration present during synthesis. Specifically, utilization of a specific range of catalyst concentration yields PIB-based TPUs with substantially improved mechanical strength.

In an example embodiment, the present invention is an elastomeric polymer comprising a hard segment and a soft segment. The hard segment is present in the amount of 10% to 60% by weight of the elastomeric polymer, wherein the hard segment includes a urethane, urea, or urethaneurea. The soft segment is present in the amount of 40% to 90% by weight of the elastomeric polymer, wherein the soft segment includes a polyisobutylene macrodiol and/or diamine and does not include a polyether macrodiol. The number average molecular weight of the elastomeric polymer is greater than or equal to 40 kilodaltons, and the polydiversity index of the hard segment is between 1.58 and 2.17, inclusive.

In another embodiment, the present invention is a method of forming a polyisobutylene-based thermoplastic urethane, comprising the steps of: reacting a polyisobutylene macrodiol and/or diamine with a diisocyanate to form a first reaction mixture; combining a metal catalyst and a chain extender with the first reaction mixture to create a second reaction mixture, a molar ratio of the metal catalyst to the diisocyanate being greater than 0.0:1 and less than or equal to 0.4:1; and reacting the second reaction mixture for a period of time sufficient to form the polyisobutylene-based thermoplastic urethane.

In another embodiment, a polyisobutylene-based thermoplastic urethane is formed by a method comprising the steps of: reacting a polyisobutylene diol with a diisocyanate to form a reaction mixture; combining a metal-catalyst of an alkyl diol with the reaction mixture, a molar ratio x of elemental metal of the metal-catalyst to diisocyanate being in a range of 0.0:1<x<0.4:1; and reacting the reaction mixture with the metal-catalyst of alkyl diol for a period of time sufficient to form the polyisobutylene-based thermoplastic urethane.

The polyisobutylene-based thermoplastic polyurethanes of the present invention can be used to manufacture elastomeric materials useful in the production of biomedical devices, surgical drains, dialysis devices, etc. The polyisobutylene-based thermoplastic materials of the present invention present a number of advantages over previously disclosed material. Specifically, these polyisobutylene-based thermoplastic materials do not rely on a polyether or polyester macrodiol to achieve sufficient mechanical properties. Without a polyether or polyester diol structure present in the polymer structure, the polyisobutylene-based thermoplastic materials of the present invention do not suffer the same bioinstability against hydrolytic and oxidative degradations that affected previously disclosed polyisobutylene-based thermoplastics.

The polyisobutylene-based thermoplastics of the present invention exhibit improved tensile strength and percent elongation beyond what was previously known without a polyether or polyester diol. By controlling the catalyst concentration, a polyisobutylene-based thermoplastic material with mechanical properties comparable to polyether or polyester macrodiol-containing polyisobutylene-based thermoplastic materials can be synthesized. These improved mechanical properties are attributed to a narrower molecular weight distribution (MWD) of the hard segments.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Glossary

Figure 1:
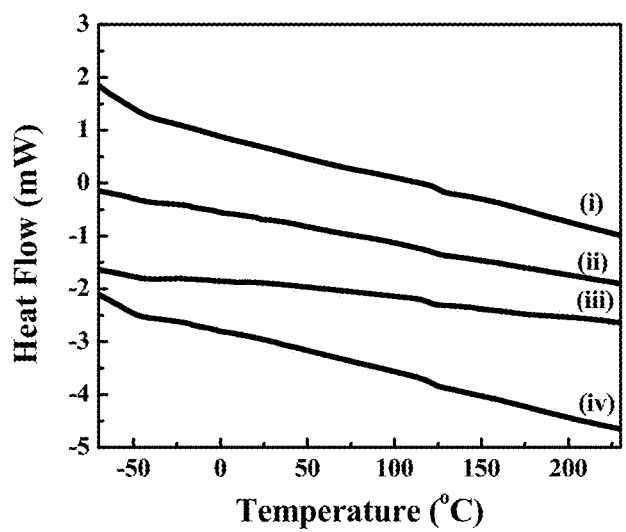
FIG. 1 is a plot of heat flow (mW) vs. Temperature (° C.).

As used herein, the term "molecular weight distribution" (MWD) refers to the distribution of molecular weight among polymer molecules in a given polymer sample. The MWD is expressed as a plot, wherein the x-axis measures the molecular weight of a polymer sample, and the y-axis measures the number of polymer molecules with that corresponding molecular weight. A narrow curve corresponds to a uniform distribution of weight among polymer molecules in a given polymer sample.

As used herein, the term "polydispersity index" (PDI) also refers to the distribution of molecular weight among polymer molecules in a given polymer sample. The PDI calculated is the weight average molecular weight divided by the number average molecular weight. PDI may be used as a measure of MWD. A PDI that approaches the value of 1 represents a uniform distribution of weight among polymer molecules in a given polymer sample.

As used herein, the term "$M_n$" refers to the number average molecular weight of a given polymer sample.

As used herein, the term "$M_w$" refers to the weight average molecular weight of a given polymer sample.

As used herein, the term "macrodiol" means a polymeric diol. Examples include polyether compounds of the formula

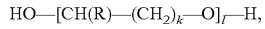

$$HO-[CH(R)-(CH_2)_k-O]_l-H, \quad (I)$$

and polyisobutylene polymers of the formula

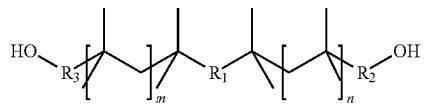

(II)

values and preferred values for the variables in formulas (I) and (II) are defined below.

Similarly, when the phrase "macrodiol and/or diamine" is used, the reference is being made to a polymeric diamine similar in structure to the diols of formulas (I) and (II), in which the terminal hydroxyl groups are replaced with amino or alkylamino groups, as defined below.

As used herein, the term "telechelic," when referring to a polymer, means a polymer carrying functionalized end-groups. Examples of telechelic polymers are difunctional polymers of formula (II), above. Telechelic polymers can be used, e.g., for the synthesis of block co-polymers.

As used herein, the term "BDO" refers to 1,4-butanediol.

As used herein, the term "MDI" refers to 4,4'-methylenebis(phenylisocyanate).

As used herein, the term "PIB" means a polyisobutylene, i.e. a compound formed by a polymerization of isobutylene.

As used herein, the term "TPU" means a thermoplastic polyurethane.

As used herein, the term "PIB-TPU" means a polyisobutylene-based thermoplastic polyurethane obtained by any known process. The term includes the elastomeric polyurethanes materials described herein.

As used herein, the term "initiator residue" refers to a difunctional chemical moiety that links two linear chains of a polymer. For example, in a polyisobutylene polymer of the formula

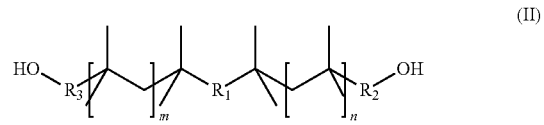

(II)

where values and preferred values are defined below, $R_1$ is an initiator residue. Examples of initiator residues include dicumyl and 5-tert-butyl-1,3 dicumyl that correspond to dicumyl chloride, methylether or ester, respectively, are used as initiator. Other examples include 2,4,4,6-tetramethylheptylene or 2,5-dimethylhexylene, which arise when 2,6-dichloro-2,4,4,6-tetramethylheptane or 2,5-dichloro-2,5-dimethylhexane is used as an initiator. Many other cationic mono- and multifunctional initiators are known in the art.

The term "alkyl," as used herein, unless otherwise indicated, means straight or branched saturated monovalent hydrocarbon radicals of formula $C_nH_{2n+1}$. In some embodiments, n is from 1 to 18. In other embodiments, n is from 1 to 12. Preferably, n is from 1 to 6. In some embodiments, n is 1 to 1000. Alkyl can optionally be substituted with —OH, —SH, halogen, amino, cyano, nitro, a $C_1$-$C_{12}$ alkyl, $C_1$-$C_{12}$ haloalkyl, $C_1$-$C_{12}$ alkoxy, $C_1$-$C_{12}$ haloalkoxy, or $C_1$-$C_{12}$ alkyl sulfanyl. In some embodiments, alkyl can optionally be substituted with one or more halogen, hydroxyl, $C_1$-$C_{12}$ alkyl, $C_1$-$C_{12}$ alkenyl or $C_1$-$C_{12}$ alkynyl group, $C_1$-$C_{12}$ alkoxy, or $C_1$-$C_{12}$ haloalkyl. The term alkyl can also refer to cycloalkyl.

The term "alkenyl," as used herein, includes the alkyl moieties as defined above, having at least one carbon-carbon double bond. In some embodiments, alkenyl groups have from 2 to 18 carbon atoms. In other embodiments, alkenyl groups have from 2 to 12 carbon atoms. Preferably, alkenyl groups have from 2 to 6 carbon atoms. Examples of alkenyl groups include ethenyl (—CH=CH$_2$), n-2-propenyl (allyl, —CH$_2$CH=CH$_2$), pentenyl, hexenyl, and the like. The term alkenyl can also refer to cycloalkenyl.

The term "alkynyl," as used herein, includes the alkyl moieties as defined above, having at least one carbon-carbon triple bond. In some embodiments, alkynyl groups have from 2 to 18 carbons. In other embodiments, alkynyl groups have from 2 to 12 carbons. Preferably, alkynyl groups have from 2 to 6 carbons. Examples of alkynyl groups include ethynyl (—C≡CH), propargyl (—CH$_2$C≡CH), pentynyl, hexynyl, and the like. The term alkynyl can also refer to cycloalkynyl.

The term "cycloalkyl", as used herein, means saturated cyclic hydrocarbons, i.e. compounds where all ring atoms are carbons. In some embodiments, a cycloalkyl comprises from 3 to 18 carbons. Preferably, a cycloalkyl comprises from 3 to 6 carbons. Examples of cycloalkyl include, but are not limited to, cyclopropyl, cyclobutyl, cyclopentyl, cyclohexyl, and cycloheptyl. In some embodiments, cycloalkyl can optionally be substituted with one or more halogen, hydroxyl, $C_1$-$C_{12}$ alkyl, $C_1$-$C_{12}$ alkenyl or $C_1$-$C_{12}$ alkynyl group, $C_1$-$C_{12}$ alkoxy, or $C_1$-$C_{12}$ haloalkyl.

The term "haloalkyl," as used herein, includes an alkyl substituted with one or more F, Cl, Br, or I, wherein alkyl is defined above.

The terms "alkoxy," as used herein, means an "alkyl-O—" group, wherein alkyl is defined above. Examples of alkoxy group include methoxy or ethoxy groups.

The term "aryl," as used herein, refers to a carbocyclic aromatic group. Preferably, an aryl comprises from 6 to 18 carbons. Examples of aryl groups include, but are not limited to phenyl and naphthyl. Examples of aryl groups include optionally substituted groups such as phenyl, biphenyl, naphthyl, phenanthryl, anthracenyl, pyrenyl, fluoranthyl or fluorenyl. An aryl can be optionally substituted. Examples of suitable substituents on an aryl include halogen, hydroxyl, $C_1$-$C_{12}$ alkyl, $C_1$-$C_{12}$ alkene or $C_1$-$C_{12}$ alkyne, $C_3$-$C_{12}$ cycloalkyl, $C_1$-$C_{12}$ haloalkyl, $C_1$-$C_{12}$ alkoxy, aryloxy, arylamino, or aryl group.

The term "aryloxy," as used herein, means an "aryl-O—" group, wherein aryl is defined above. Examples of an aryloxy group include phenoxy or naphthoxy groups.

The term "amino," as used herein, means an "—$NH_2$," an "$NHR_p$," or an "$NR_pR_q$," group, wherein $R_p$ and $R_q$ may be any of the alkyl, alkenyl, alkynyl, alkoxy, cycloalkyl, cycloalkoxy, aryl, heteroaryl, and bicyclic carbocyclic groups. In the present invention, the amino may be primary ($NH_2$), secondary ($NHR_p$) or tertiary ($NR_pR_q$). A dialkylamino group is an instance of an amino group substituted with one or two alkyls. A trialkylamino group is a group —$N^+(R_t)_3$, wherein $R_t$ is an alkyl, as defined above.

The term "arylamine," as used herein, means an "aryl-NH—," an "aryl-N(alkyl)-," or an "$(aryl)_2$-N—" group, wherein aryl and alkyl are defined above.

The term "heteroaryl," as used herein, refers to aromatic groups containing one or more heteroatoms (O, S, or N). A heteroaryl group can be monocyclic or polycyclic, e.g., a monocyclic heteroaryl ring fused to one or more carbocyclic aromatic groups or other monocyclic heteroaryl groups. The heteroaryl groups of this invention can also include ring systems substituted with one or more oxo moieties. Examples of heteroaryl groups include, but are not limited to, pyridinyl, pyridazinyl, imidazolyl, pyrimidinyl, pyrazolyl, triazolyl, pyrazinyl, quinolyl, isoquinolyl, tetrazolyl, furyl, thienyl, isoxazolyl, thiazolyl, oxazolyl, isothiazolyl, pyrrolyl, quinolinyl, isoquinolinyl, indolyl, benzimidazolyl, benzofuranyl, cinnolinyl, indazolyl, indolizinyl, phthalazinyl, pyridazinyl, triazinyl, isoindolyl, purinyl, oxadiazolyl, thiazolyl, thiadiazolyl, furazanyl, benzofurazanyl, benzothiophenyl, benzotriazolyl, benzothiazolyl, benzoxazolyl, quinazolinyl, quinoxalinyl, naphthyridinyl, dihydroquinolyl, tetrahydroquinolyl, dihydroisoquinolyl, tetrahydroisoquinolyl, benzofuryl, furopyridinyl, pyrolopyrimidinyl, and azaindolyl.

The foregoing heteroaryl groups may be C-attached or N-attached (where such is possible). For instance, a group derived from pyrrole may be pyrrol-1-yl (N-attached) or pyrrol-3-yl (C-attached).

Suitable substituents for heteroaryl are as defined above with respect to aryl group.

Suitable substituents for an alkyl or cycloalkyl include a halogen, an alkyl, an alkenyl, a cycloalkyl, a cycloalkenyl, an aryl, a heteroaryl, a haloalkyl, cyano, nitro, haloalkoxy.

Further examples of suitable substituents for a substitutable carbon atom in an aryl, a heteroaryl, alkyl or cycloalkyl include but are not limited to —OH, halogen (F, Cl, Br, and I), —R, —OR, —$CH_2R$, —$CH_2OR$, —$CH_2CH_2OR$. Each R is independently an alkyl group.

In some embodiments, suitable substituents for a substitutable carbon atom in an aryl, a heteroaryl or an aryl portion of an arylalkenyl include halogen, hydroxyl, $C_1$-$C_{12}$ alkyl, $C_1$-$C_{12}$ alkenyl or $C_1$-$C_{12}$ alkynyl group, $C_1$-$C_{12}$ alkoxy, aryloxy group, arylamino group, and $C_1$-$C_{12}$ haloalkyl.

In addition, the above-mentioned groups may also be substituted with =O, =S, =N— alkyl.

Polyurethanes and Polyureas

As used herein, "polyurethane" is any polymer consisting of a chain of organic units joined by urethane (carbamate, —NH—COO—) links. Polyurethane polymers can be formed by reacting a molecule containing at least two isocyanate functional groups with another molecule containing at least two alcohol (hydroxyl) groups. By reacting an isocyanate group, —N=C=O, with a hydroxyl group, —OH, a urethane linkage is produced. A catalyst can be used. Similarly, in polyureas the links are urea groups (NH—CO—NH—) that are obtained by reacting an isocyanate group with an amine group —NH2.

For example, polyurethanes can be produced by the polyaddition reaction of a polyisocyanate with a polyalcohol (a polyol, an example of which is a macrodiol). The reaction mixture can include other additives. A polyisocyanate is a molecule with two or more isocyanate functional groups, $R_1$—$(N=C=O)_{n\geq2}$, and a polyol is a molecule with two or more hydroxyl functional groups, $R_2$—$(OH)_{n\geq2}$. $R_1$ and $R_2$ are each independently an aliphatic or an aromatic moiety. The reaction product is a polymer containing the urethane linkage, —$R_1NHCOOR_2$—.

Polyisocyanates that contain two isocyanate groups are called diisocyanates. Isocyanates can be aromatic, such as diphenylmethane diisocyanate (MDI) or toluene diisocyanate (TDI); or aliphatic, such as hexamethylene diisocyanate (HDI) or isophorone diisocyanate (IPDI). An example of an isocyanate is polymeric diphenylmethane diisocyanate, which is a blend of molecules with two-, three-, and four- or more isocyanate groups, with an average functionality of 2.7.

Polyols that contain two hydroxyl groups are called macrodiols, those with three hydroxyl groups are called macrotriols. Examples of polyols include polycarbonate polyols, polycaprolactone polyols, polybutadiene polyols, and polysulfide polyols.

Additives such as catalysts, surfactants, blowing agents, cross linkers, flame retardants, light stabilizers, and fillers are used to control and modify the reaction process and performance characteristics of the polymer.

Examples of aromatic isocyanates are toluene diisocyanate (TDI) and diphenylmethane diisocyanate (MDI). TDI consists of a mixture of the 2,4- and 2,6-diisocyanatotoluene isomers. Another example of an aromatic isocyanate is TDI-80, consisting of 80% of the 2,4-isomer and 20% of the 2,6-isomer.

Examples of aliphatic (including cycloaliphatic) isocyanates are 1,6-hexamethylene diisocyanate (HDI), 1-isocyanato-3-isocyanatomethyl-3,5,5-trimethyl-cyclohexane (isophorone diisocyanate, IPDI), and 4,4'-diisocyanato dicyclohexylmethane ($H_{12}$MDI). Other aliphatic isocyanates include cyclohexane diisocyanate (CHDI), tetramethylxylene diisocyanate (TMXDI), and 1,3-bis(isocyanatomethyl)cyclohexane ($H_6$XDI).

Chain extenders (f=2) and cross linkers (f=3 or greater) are low molecular weight hydroxyl and amine terminated compounds that play an important role in the polymer morphology of polyurethane fibers, elastomers, adhesives, and certain integral skin and microcellular foams. Examples of chain extenders and cross linkers are ethylene glycol (EG), 1,4-butanediol (BDO), diethylene glycol (DEG), glycerine, and trimethylol propane (TMP).

The elastomeric properties of polyurethanes, polyureas and polyurethaneureas are derived from the phase separation of the "hard segment" and the "soft segment" domains of the polymer chain. For example, hard segments that comprise urethane units can serve as cross-links between the soft segments that comprise polyol (e.g., macrodiol) units (e.g., polyisobutane diols). Without being limited to any particular theory, it is believed that the phase separation occurs because the mainly non-polar, low melting soft segments are incompatible with the polar, high melting hard segments. The polyol-containing soft segments are mobile and are normally present in coiled formation, while the isocyanate-containing hard segments (which can also include chain extenders) are stiff and immobile. Because the hard segments are covalently coupled to the soft segments, they inhibit plastic flow of the polymer chains, thus creating elastomeric resiliency. Upon mechanical deformation, a portion of the soft segments are stressed by uncoiling, and the hard segments become aligned in the stress direction. This reorientation of the hard segments and consequent powerful hydrogen bonding contributes to high tensile strength, elongation, and tear resistance values.

Although the synthesis of polyurethanes is usually presented as proceeding via formation of urethane (carbamate) linkages by the reaction of isocyanates and alcohols, this is an oversimplification. See, for example, G. ODIAN: PRINCIPLES OF POLYMERIZATION, FOURTH ED. Wiley Interscience, 2004. Accordingly, it is more convenient to define the polyurethane compositions via weight percent of the components rather than structurally.

Accordingly, in an example embodiment, the present invention is an elastomeric polymer, comprising (1) a hard segment in the amount of 10% to 60% by weight of the elastomeric polymer, wherein the hard segment includes a urethane, urea or urethaneurea; and (2) a soft segment in the amount of 40% to 90% by weight of the elastomeric polymer, wherein the soft segment includes a polyisobutylene macrodiol and/or diamine and does not include a polyether macrodiol.

In another embodiment, the number average molecular weight of the elastomeric polymer is greater than or equal to about 40 kilodaltons (kDa). In other embodiments, the number average molecular weight of the elastomeric polymer is greater than or equal to about 50 kDa. In alternative embodiments, wherein the number average molecular weight of the elastomeric polymer is greater than or equal to about 60 kDa, greater than or equal to about 70 kDa, greater than or equal to about 80 kDa, greater than or equal to about 90 kDa, greater than or equal to about 100 kDa, greater than or equal to about 110 kDa, greater than or equal to about 120 kDa, greater than or equal to about 130 kDa, greater than or equal to about 140 kDa, or greater than or equal to about 150 kDa.

In another embodiment, the hard segment can be present in the amount of 15, 20, 25, 30, 35, 40, 45, 50, or 55%.

In another embodiment, the soft segment can be present in the amount of 45, 50, 55, 60, 65, 70, 75, 80, or 85%.

In another embodiment, the polydiversity index of the hard segment can be greater than or equal to 1.58 and less than or equal to 2.17.

In another embodiment, the soft segment consists essentially of polyisobutylene macrodiol and/or diamine.

One of ordinary skill can easily determine a suitable polyether macrodiol. Preferably, at least one polyether macrodiol is a compound of formula

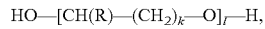

wherein R, for each occurrence, is independently a $C_1$-$C_{12}$ alkyl, or —H; k is an integer not less than 1, and l is an integer not less than 1.

One of ordinary skill can easily determine a suitable polyisobutylene macrodiol or diamine. Preferably, at least one polyisobutylene macrodiol and/or diamine is of formula:

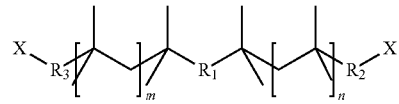

wherein each X is independently —OH, —$NH_2$, or —$NHR_4$. $R_1$ is an initiator residue. $R_2$, $R_3$, and $R_4$ is, each independently, a $C_1$-$C_{16}$ alkyl, a $C_3$-$C_{16}$ cycloalkyl, a $C_2$-$C_{16}$ alkenyl, a $C_3$-$C_{16}$ cycloalkenyl, a $C_2$-$C_{16}$ alkynyl, a $C_3$-$C_{16}$ cycloalkynyl, or a $C_6$-$C_{18}$ aryl, wherein, for each occurrence, $R_2$ or $R_3$ is, independently, optionally substituted with one or more groups selected from halo, cyano, nitro, dialkylamino, trialkylamino, $C_1$-$C_{16}$ alkoxy, and $C_1$-$C_{16}$ haloalkyl. Variables n and m are each, independently, integers from 1 to 500.

In another embodiment, the polyisobutylene macrodiol can be hydroxyallyl telechelic polyisobutylene or hydroxyalkyl telechelic polyisobutylene. For example, the polyisobutylene macrodiol can be hydroxypropyl telechelic polyisobutylene.

In another embodiment, the polyisobutylene macrodiamine can be aminoallyl telechelic polyisobutylene.

In another embodiment, the molecular weight of at least one polyisobutylene macrodiol or diamine is about 400 Da to about 6000 Da. For example, the molecular weight of at least one polyisobutylene macrodiol or diamine can be about 500, 1000, 2000, 3000, 4000, or 5000 Da. In certain embodiments, the molecular weight of at least one polyisobutylene macrodiol or diamine is about 1000 Da to about 3000 Da. For example, the molecular weight of at least one polyisobutylene macrodiol or diamine can be about 1000, 1500, 2000, or 2500 Da.

In a preferred embodiment, $R_2$ and $R_3$ is, each independently, a moiety selected from the group consisting of —$CH_2$—CH═CH—$CH_2$—; —$CH_2$—$CH_2$—$CH_2$—$CH_2$—; —$CH_2$—$CH_2$—$CH_2$—; and —$CH_2$—CH($CH_3$)—$CH_2$—.

In another embodiment, the elastomeric polymer of the present invention comprises a hard segment present in the amount of from about 30% to about 50% by weight of the elastomeric polymer. For example, the hard segment can be present in the amount of 35, 40, or 45%.

Examples of the hard segments include the hard segments which are a product of reacting a diisocyanate with a chain extender. One of ordinary skill in the art will easily determine a suitable diisocyanate or a chain extender.

The diisocyanate can be at least one member selected from the group consisting of 4,4'-methylenephenyl diisocyanate; methylene diisocyanate; p-phenylene diisocyanate;

cis-cyclohexane-1,4-diisocyanate; trans-cyclohexane-1,4-diisocyanate; a mixture of cis-cyclohexane-1,4-diisocyanate and trans-cyclohexane-1,4-diisocyanate; 1,6-hexamethylene diisocyanate; 2,4-toluene diisocyanate; cis-2,4-toluene diisocyanate; trans-2,4-toluene diisocyanate; a mixture of cis-2,4-toluene diisocyanate and trans-2,4-toluene diisocyanate; p-tetramethylxylene diisocyanate; and m-tetramethylxylene diisocyanate.

The chain extender may be a $C_2$-$C_{12}$ alkyl diol or a $C_2$-$C_{12}$ alkyl diamine.

The chain extender may also be at least one member selected from the group consisting of 1,4-butanediol; 1,5 pentanediol; 1,6-hexanediol; 1,8-octanediol; 1,9-nonanediol; 1,10-decanediol, 1,12-dodacanediol; 1,4-cyclohexane dimethanol; p-xyleneglycol; and 1,4-bis(2-hydroxyethoxy) benzene.

Alternatively, the chain extender may be at least one member selected from the group consisting of 1,4-diaminobutane; 1,5-diaminopentane; 1,6-diaminohexane; 1,8-diaminooctane; 1,9-diaminononane; 1,10-diaminodecane; 1,12-diaminododecane; 1,4-diaminocyclohexane; 2,5-diaminoxylene; and isophoronediamine.

In a preferred embodiment, the elastomeric polymer of the present invention the polyisobutylene macrodiol is hydroxyallyl telechelic polyisobutylene and the hard segment includes a product of a reaction of 4,4'-methylenediphenyl diisocyanate and 1,4-butanediol.

In another embodiment, the present invention is an article of manufacture comprising any of the polyurethane elastomeric compositions described above. In preferred embodiments, the article is a medical device or an implant. Examples of the article of the present invention include a cardiac pacemaker, a defibrillator, a catheter, an implantable prosthesis, a cardiac assist device, an artificial organ, a pacemaker lead, a defibrillator lead, a blood pump, a balloon pump, an arteriovenus shunt, a biosensor, a membrane for cell encapsulation, a drug delivery device, a wound dressing, an artificial joint, an orthopedic implant or a soft tissue replacement. In other embodiments, the article is a fiber, film, engineering plastic, fabric, coating, or adhesive joint.

The methods of synthesis of polyurethane compositions are generally well known by one of ordinary skill in the art of polymer chemistry. See, for example, Gunter Oertel, "Polyurethane Handbook", 2nd ed. Hanser Publishers (1993); or Malcolm P. Stevens, "Polymer Chemistry", 3d ed. Oxford University Press (1999). The relevant portions of these publications are incorporated herein by reference.

The present invention is based, in part, on the discovery of new and improved methods of polyurethane synthesis. In an example embodiment, the present invention is a method of forming a polyisobutylene-based thermoplastic, comprising the steps of (a) reacting a polyisobutylene macrodiol and/or diamine with a diisocyanate to form a first reaction mixture; (b) combining a metal catalyst and a chain extender with the first reaction mixture to create a second reaction mixture, a molar ratio of the metal catalyst to the diisocyanate being greater than 0.0:1 and less than or equal to 0.4:1; and (c) reacting the second reaction mixture for a period of time sufficient to form the polyisobutylene-based thermoplastic urethane.

In another embodiment, the polyisobutylene-based thermoplastic urethane resulting from the above method comprises (1) a hard segment in the amount of 10% to 60% by weight of the elastomeric polymer, wherein the hard segment includes a urethane, urea or urethaneurea; and (2) a soft segment in the amount of 40% to 90% by weight of the elastomeric polymer, wherein the soft segment includes a polyisobutylene macrodiol and/or diamine and does not include a polyether macrodiol.

Preferably, the polyisobutylene-based thermoplastic urethane includes a hard segment with a polydiversity index greater than or equal to 1.58 and less than or equal to 2.17.

In the present invention, a catalyst may be present in the second reaction mixture, such as stannous octoate ($Sn(oct)_2$). Other catalysts are well known in the art and can be used by one of the ordinary skill in the art.

Any one or more of the isocyanates, chain extenders, or various additives can be employed with the synthetic method of the present invention. Any amounts of the components and their combinations described above can be used.

In an example embodiment, the present invention relates to polyisobutylene-based thermoplastic urethanes, formed by a method comprising the steps of (a) reacting a polyisobutylene diol with a diisocyanate to form a reaction mixture; (b) combining a metal-catalyst of an alkyl diol with the reaction mixture, a molar ratio x of elemental metal of the metal-catalyst to diisocyanate being in a range of 0.0:1<x<0.4:1; and (c) reacting the reaction mixture with the metal-catalyst of alkyl diol for a period of time sufficient to form the polyisobutylene-based thermoplastic urethane.

EXEMPLIFICATION

Materials 4,4'-Methylenebis(phenyl isocyanate) (MDI) (98%), 1,4-butandiol (BDO) (99%), Tin(II) 2-ethylhexanoate ($Sn(oct)_2$) (95%), $KMnO_4$, chloroform (at least 99.8%), LiBr (Lithium bromide at least 99%), KOH (potassium hydroxide), $Na_2SO_4$ (sodium sulfate), Trifluoroacetic acid (TFA), and toluene (>99.5%) were purchased from Sigma-Aldrich. Tetra-n-butylammonium bromide (TBAB, at least 98%) was purchased from Alfa Aesar. Toluene was dried over sodium metal and distilled. Tetrahydrofuran (THF) was refluxed over sodium metal and benzophenone over night and distilled under nitrogen atmosphere prior to use. Hexanes were purified by refluxing over sulfuric acid for 24 hours. They were washed with aqueous solution of KOH three times followed by distilled water. Then they were stored over sodium sulfate over night at room temperature. Finally they were distilled over $CaH_2$ under nitrogen atmosphere before use. BDO was dried at 70° C. under vacuum before use. All the other chemicals were used as received.

Instrumentation

Gel permeation chromatography (GPC) was measured on a Waters system equipped with a model 510 HPLC pump, model 410 differential refractometer, model 441 absorbance detector and online multiangle laser light scattering detector. Tetrahydrofuran (THF) containing 2 wt % tetra-n-butylammonium bromide (TBAB) was used as the flow phase, and the flow rate was 1 mL/min.

Differential scanning calorimetry (DSC) was performed on a TA Instrument Q100 instrument equipped with a refrigerated cooling system and nitrogen purge (50 mL/min). About 5-10 mg of sample was sealed in an aluminum pan and heated or cooled at a rate of 10° C./min. To minimize the effects of thermal history, the samples were cycled at a rate 10° C./min between −80° C. and 240° C.

Dynamic mechanical analysis (DMA) was performed on a TA Instruments Q800 instrument. The TPUs were first compression molded at 180° C. into flat films, which were then cut into rectangular thin strips and fixed onto a film tension clamp and heated from −100° C. to 40° C. at a rate of 2° C./min and a frequency of 1 Hz.

Two-dimensional small angle X-ray scattering (SAXS) was performed at beamline X27C, National Synchrotron Light Source (NSLS), Brookhaven National Laboratory (BNL). The wavelength of incident X-ray beam was 0.1371 nm, and the sample-to-detector distance was 1789.70 mm. Samples were cut from the compression molded films, mounted onto the sample stage and measured in the open air. Scattering signals were collected by a marCCD 2D detector with a resolution of 158 μm/pixel. Typical exposure time was between 30-90 s. One-dimensional SAXS profiles were obtained by integration of the corresponding two-dimensional scattering patterns and the subsequent background subtraction. Absolute scattering intensity was then determined using a pre-calibrated glassy carbon secondary standard.

For one-dimensional SAXS profiles, scattering intensity I(q) is plotted as a function of scattering vector q, which is defined as:

$$q = \frac{4\pi}{\lambda}\sin\theta \qquad (1)$$

Here λ is the wavelength of incident X-ray beam, and 2θ is the scattering angle. If microphase separation is observed, domain spacing d can be calculated by:

$$d = \frac{2\pi}{q_{max}} \qquad (2)$$

where $q_{max}$ is the position of the scattering peak.

If the HS and SS in a TPU are completely microphase separated, the theoretical electron density variance $\overline{(\Delta\rho)^2}$ is defined as:

$$\overline{(\Delta\rho)^2} = \phi_H\phi_S(\rho_H-\rho_S)^2 \qquad (3)$$

Here $\varphi_H$ and $\varphi_S$ correspond to the volume fraction of HS and SS in the TPU, and $\rho_H$ and $\rho_S$ are the electron density of the HS and SS, respectively. Electron density of a given compound $\rho_e$ can be calculated by $$\rho_e = \rho_m \frac{\sum_i Z_i}{\sum_i A_i} \qquad (4)$$

Where $\rho_m$ is the mass density of the compound, and $Z_i$ and $A_i$ are the atom number and atomic weight of each atom in the compound.

The actual electron density variance $\overline{(\Delta\rho')^2}$, on the other hand, is related to scattering invariant Q according to the following relationship:

$$\overline{(\Delta\rho')^2} = cQ = c\int_0^\infty I(q)q^2 dq \qquad (5)$$

and c is a constant:

$$c = \frac{1}{2\pi^2 i_e N_A^2} = 1.76\times10^{-24} \text{ mol}^2/\text{cm}^2 \qquad (6)$$

Here $i_e$ is the Thompson's constant for the scattering from one electron, with the value of $7.94\times10^{-26}$ cm$^2$, and $N_A$ is Avogadro's number. Therefore, degree of microphase separation can be calculated as follows:

$$\text{Degree of microphase separation} = \overline{(\Delta\rho')^2}/\overline{(\Delta\rho)^2} \qquad (7)$$

Static tensile properties were measured using an Instron Tensile Tester 4400R. The TPUs were compression molded into films by using a Carver Laboratory Press Model C at 180° C. and a load of 16000 lbs. The thickness of the films ranged between 0.2-0.3 mm. Dog-bone specimen were punched out according to ASTM D412 and pulled in the Instron at an extention rate of 50 mm/min using a 50 lbs load cell.

Example 1: Preparation of PIB(allyl-OH)$_2$

Br-Allyl-PIB-Allyl-Br ($M_n$=2200, 50 g, 0.023 mol) was dissolved in dry THF (1 liter) and a solution of KOH (50 g, 0.9 mol) in distilled water (500 mL) was added to it. The mixture was heated for 3 hour at 130° C. in a reactor. The reaction was cooled to room temperature. The THF was evaporated using a rotary evaporator. Distilled methanol (500 mL) was added and the precipitate was allowed to settle down. The precipitate was further dissolved in hexanes (200 mL) and slowly added to methanol (600 mL). The sticky mass was allowed to settle down. The process was repeated two times and the purified polymer was finally dried under vacuum at room temperature for 24 hour. Yield: 99%, GPC-MALLS: $M_n$=2400, polydispersity index (PDI)=1.16.

Example 2: Synthesis of Polyisobutylene-Based Thermoplastic Polyurethane (PIB-TPU) Using PIB(OH)$_2$ To a 100 mL three-neck round bottom flask equipped with mechanical stirring and nitrogen purging, 5.20 g PIB(OH)$_2$ (2.60 mmol) was added and dried under vacuum at 60° C. overnight to remove moisture. After that, 20 mL dry toluene was added to dissolve the PIB(OH)$_2$, and 1.76 g MDI (6.8991 mmol) was added subsequently at room temperature. The mixture was stirred at 100° C. for 2 h, and then 0.3662 g BDO (4.1691 mmol) and 1.1 mg Tin (II) 2-ethylhexanoate (0.0028 mmol) were added. The mixture was further stirred at 100° C. for 4 h and cooled to room temperature. The polymer was cured at room temperature under nitrogen purging for 1 week and then dried at 70° C. under vacuum overnight to remove residual solvent.

Five PIB-based TPUs were prepared and their characteristics are listed in Table 1. These TPUs were synthesized via the procedure in Example 2 using Sn(oct)$_2$ as the catalyst. For all the TPUs, molecular weight of the PIB(OH)$_2$ is 2000 g/mol, the hard segment (HS) is based on 4,4'-methylenebis (phenyl isocyanate) (MDI) and 1,4-butandiol (BDO), and the weight fraction of soft segment (SS) is 65%. Catalyst concentration of these TPUs ranges from 1 mol % to 0 mol %, as related to the total amount of MDI.

TABLE 1

Summary of the characteristics of PIB(OH)$_2$-based TPUs synthesized using different catalyst concentrations

| TPU sample | w (SS) (%) | Catalyst Concentration (%) | $M_n$ (kg/mol) | $M_w$ (kg/mol) | PDI |
|---|---|---|---|---|---|
| PIBPU-0Sn | 65 | 0 | 64.5 | 102.1 | 1.58 |
| PIBPU-004Sn | 65 | 0.04 | 75.0 | 139.0 | 1.87 |
| PIBPU-01Sn | 65 | 0.1 | 101.9 | 220.8 | 2.17 |

TABLE 1-continued

Summary of the characteristics of PIB(OH)$_2$-based TPUs synthesized using different catalyst concentrations

| TPU sample | w (SS) (%) | Catalyst Concentration (%) | $M_n$ (kg/mol) | $M_w$ (kg/mol) | PDI |
|---|---|---|---|---|---|
| PIBPU-04Sn | 65 | 0.4 | 167.5 | 354.5 | 1.62 |
| PIBPU-1Sn | 65 | 1 | 103.5 | 189.7 | 1.83 |

Example 3: Synthesis of Polyisobutylene-Based Thermoplastic Polyurethane (PIB-TPU) Using PIB(allyl-OH)$_2$ TPUs using PIB(allyl-OH)$_2$ were prepared by a method analogous to the PIB(OH)$_2$-based TPU synthesis described in Example 2. Table 2 represents the number average molecular weight and MWD of PIB(allyl-OH)$_2$ based TPUs.

TABLE 2

Molecular Weight and MWD of TPUs Synthesized Using PIB(allyl-OH)$_2$

| Run | Catalyst Concentration (%) | $M_n$ (kg/mol) | MWD |
|---|---|---|---|
| PSPU-1 | 0.04 | 58.3 | 1.79 |
| PSPU-2 | 0.10 | 96.5 | 2.25 |
| PSPU-3 | 0.40 | 78.0 | 1.80 |
| PSPU-4 | 1.00 | 92.0 | 1.95 |

Thermal Analysis of PIB(OH)$_2$-Based TPUs

The thermal properties of the PIB(OH)$_2$-based TPUs in Table 1 were subsequently investigated. PIB-TPUs, in most cases, do not have pure soft segment (SS) and hard segment (HS) microphase separation from each other. Instead, the microphase separated structure of TPU contains a soft phase (SP) and a hard phase (HP), where SP is formed by the dissolution of some HS into the SS, and HP consists of HS that phase separates from the SP. Measuring the glass transition temperature of the SP ($T_g$ (SP)) reflects the composition of SP and thus the degree of microphase separation. FIG. 1 is a plot that represents the differential scanning calorimetry (DSC) profiles of the TPUs, measuring heat flow (mW) as a function of temperature. Unfortunately, DSC of these TPUs did not show clearly $T_g$ (SP), so it is not clear if changing the catalyst concentration leads to different degree of microphase separation. These DSC results show, however, that none of the samples show melting peak of the HS, indicating that catalyst concentration has no effects on HS crystallization.

Figure 2A:
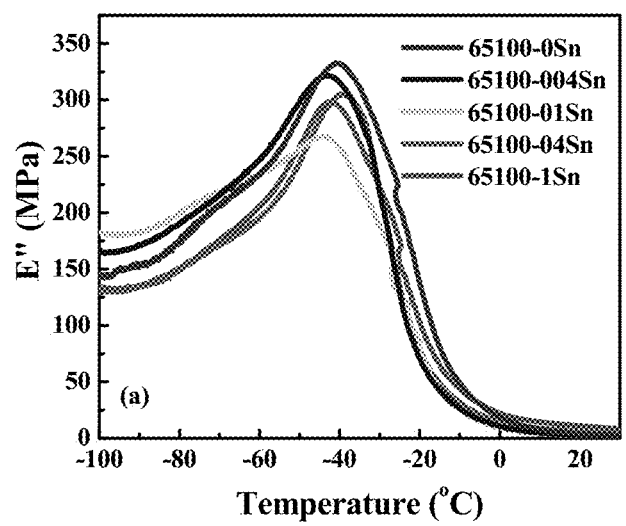
FIG. 2A is a plot of loss modulus (E") vs. Temperature (° C.).
Figure 2B:
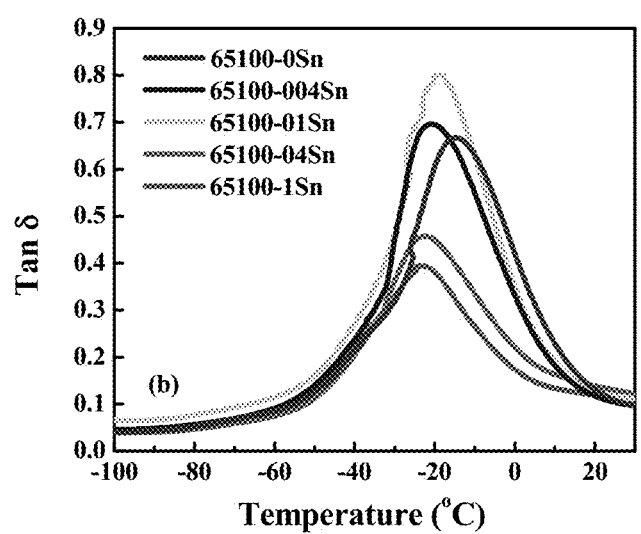
FIG. 2B is a plot of tan δ vs. Temperature (° C.).

FIGS. 2A and 2B represent the results of dynamic mechanical analysis (DMA) on the TPU samples from Table 1. FIG. 2A is a plot of the DMA profiles of loss modulus (E") as a function of temperature of PIB-based TPUs. FIG. 2B is a plot of the DMA profiles of tan δ as a function of temperature of PIB-based TPUs. It is evident that all the samples show $T_g$ (SP) much higher than $T_g$ of PIB homopolymer. This is in agreement with previous results that microphase separation is incomplete in PIB-based TPUs. Table 3 further summarizes the value of $T_g$ (SP) of these TPUs. As can be seen, all the samples have similar $T_g$ (SP), indicating that the degree of microphase separation is not significantly affected by catalyst concentration.

TABLE 3

Summary of value of $T_g$(SP) of PIB-based TPUs

| | $T_g$(SP) (° C.) | |
|---|---|---|
| TPU | Determined from E" | Determined from tan δ |
| PIBPU-0Sn | −40.4 | −14.1 |
| PIBPU-004Sn | −43.4 | −20.6 |
| PIBPU-01Sn | −44.1 | −18.8 |
| PIBPU-04Sn | −38.5 | −22.2 |
| PIBPU-1Sn | −42.8 | −22.5 |

Figure 3A:
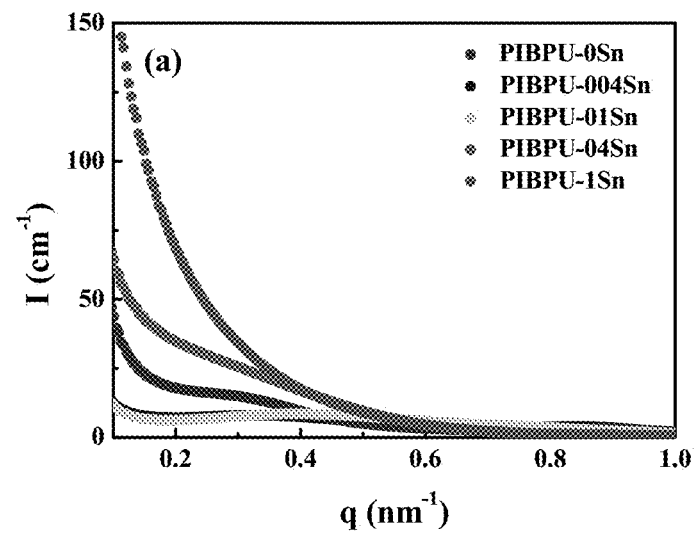
FIG. 3A is a plot of $I(cm^{-1})$ vs. $q(nm^{-1})$.
Figure 3B:
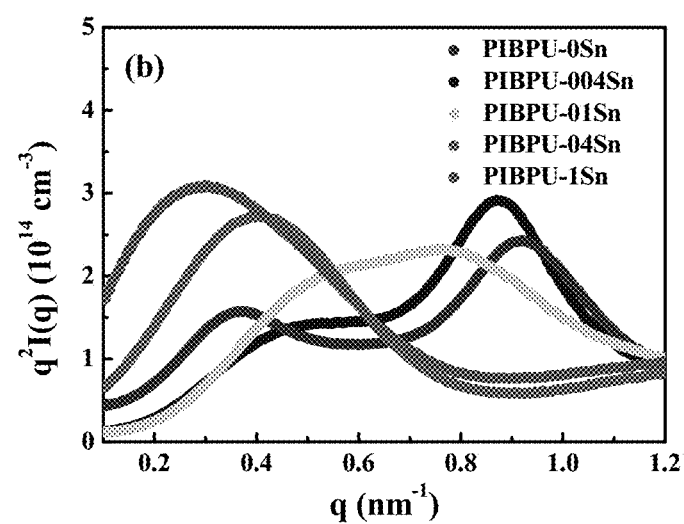
FIG. 3B is a plot of $q^2 I(q)(10^{14}\ cm^{-3})$ vs. $q(nm^{-1})$.

FIGS. 3A and 3B represent the results of small angle X-ray scattering (SAXS) on the TPU samples from Table 1. The samples were compression molded at 180° C. FIG. 3A is a plot of the SAXS profiles of I as a function of q for PIB-based TPUs. FIG. 3B is a plot of the SAXS profiles of $q^2I$ as a function of q for PIB-based TPU's. Both PIBPU-004Sn and PIBPU-0Sn show two separate scattering peaks, one in the q range of 0.35-0.5 nm$^{-1}$, and the other one around 0.9 nm$^{-1}$. This result is in agreement with previous observations that two different microphase separated structures can be observed in PIB-based TPUs with a certain range of SS weight fraction. PIBPU-01Sn also shows two scattering peaks, at q=0.76 nm$^{-1}$ and q=0.54 nm$^{-1}$, respectively, but the peak at lower q value only appears as a weak shoulder. On the other hand, PIBPU-04Sn and PIBPU-1Sn only show one scattering peak in the q range of 0.3-0.4 nm$^{-1}$, and no additional peak is observed at higher q range. These results clearly suggest that catalyst concentration has dramatic effects on the microphase separated morphology of PIB-based TPUs. It is likely that increasing the concentration of Sn(oct)$_2$ leads to the disappearance of the microphase separated structure with smaller domain spacing.

The actual electron density variance $\overline{(\Delta\rho')^2}$ of these PIB-based TPUs was then calculated using eq. (5) and (6). According to literature, low molecular weight PIB has a density of 0.913 g/cm$^3$, and density of HS based on MDI and BDO is reported to be 1.33-1.4 g/cm$^3$. A value of 1.33 g/cm$^3$ was used. If the contribution of residual Sn catalyst on X-ray scattering contrast can be neglected, according to eq. (3) and eq. (4), $\overline{(\Delta\rho)^2}$ of these PIB-based TPUs is 6.40×10$^{-3}$ (mol e$^-$/cm$^3$)$^2$. Therefore, degree of microphase separation of these samples can be calculated via eq. (7), and the results are summarized in Table 4.

TABLE 4

Summary of domain spacing and degree of microphase separation for PIB-based TPUs synthesized under different catalyst concentrations

| Sample | $d_1$ (nm) | $d_2$ (nm) | $\overline{(\Delta\rho')^2}$ × 10$^3$((mol e$^-$/cm$^3$)$^2$) | Degree of Microphase Separation |
|---|---|---|---|---|
| PIBPU-0Sn | 17.0 | 6.9 | 3.30 | 0.52 |
| PIBPU-004Sn | 12.3 | 7.1 | 3.17 | 0.49 |
| PIBPU-01Sn | 11.2 | 8.27 | 3.48 | 0.54 |
| PIBPU-04Sn | 15.3 | N/A | 3.33 | 0.52 |
| PIBPU-1Sn | 20.3 | N/A | 4.12 | 0.64 |

It is evident that, all the samples have degree of microphase separation around 0.5-0.6. This is consistent with previous investigation that microphase separation in PIB-based TPUs is not complete. It is also clear that, while varying catalyst concentration results in substantial change in the domain spacing of these TPUs, it does not affect degree of microphase separation significantly. As can be seen, although PIBPU-1Sn has a much higher degree of microphase separation, about 0.64, all the other four samples have degree of microphase separation around 0.5.

Figure 4A:
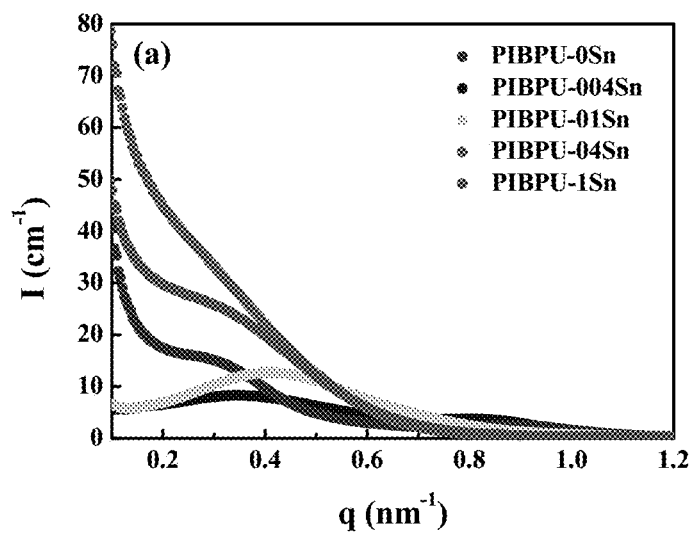
FIG. 4A is a plot of $I(cm^{-1})$ vs. $q(nm^{-1})$.
Figure 4B:
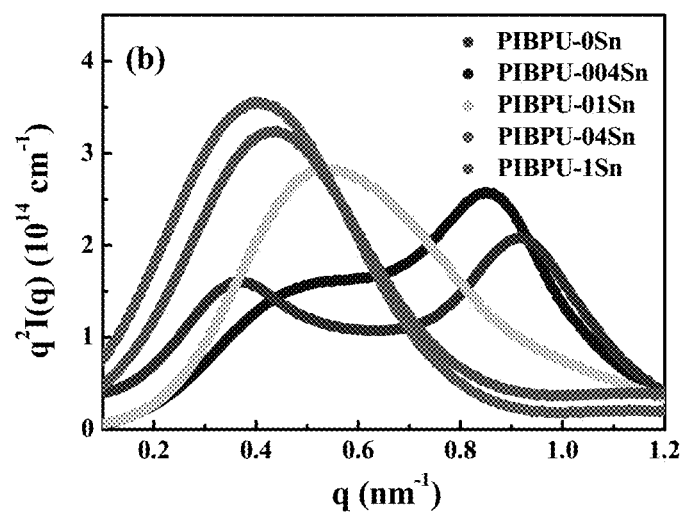
FIG. 4B is a plot of $q^2I(q)(10^{14}\ cm^{-3})$ vs. $q(nm^{-1})$.

FIGS. 4A and 4B represent results of SAXS after the samples were compression molded at 180° C., and further annealed at 140° C. for 12 h. FIG. 4A is a plot of the SAXS profiles of I as a function of q for PIB-based TPUs. FIG. 4B is a plot of the SAXS profiles of $q^2I$ as a function of q for PIB-based TPU's. As can be seen from FIGS. 4A, 4B, and Table 5, for most samples the shape of SAXS profiles and value of domain spacing did not change significantly during annealing, although for PIBPU-01Sn, the shoulder peak at $q=0.54$ nm$^{-1}$ disappeared after annealing, and for PIBPU-1Sn, annealing resulted in an decrease in domain spacing. It is also clear that all the TPUs showed a decrease in degree of microphase separation after thermal annealing. This is in agreement with previous results that thermal annealing can promote the phase mixing between the SS and HS. For the annealed samples, degree of microphase separation is also not significantly dependent on catalyst concentration. As can be seen from Table 5, the degree of microphase separation slightly increased from 0.41 to 0.48 as the Sn(oct)$_2$ concentration increased from 0 to 0.4 mol %, but it slightly dropped to 0.46 as the catalyst concentration further increased to 1 mol %.

TABLE 5

Summary of domain spacing and degree of microphase separation for PIB-based TPUs synthesized under different catalyst concentrations

| Sample | $d_1$ (nm) | $d_2$ (nm) | $\overline{(\Delta\rho')^2} \times 10^3$ ((mol e$^-$/cm$^3$)$^2$) | Degree of Microphase Separation |
|---|---|---|---|---|
| PIBPU-0Sn | 17.4 | 6.8 | 2.64 | 0.41 |
| PIBPU-004Sn | 12.1 | 7.3 | 2.69 | 0.42 |
| PIBPU-01n | 11.7 | N/A | 2.82 | 0.44 |
| PIBPU-04Sn | 15.7 | N/A | 3.10 | 0.48 |
| PIBPU-1Sn | 14.3 | N/A | 2.94 | 0.46 |

Figure 5:
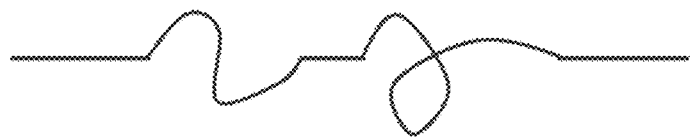
FIG. 5 is an illustration that represents example structural conformations PIB-based TPUs may form based on catalyst concentration.
Figure 5:

FIG. 5 is an illustration that represents example structural conformations PIB-based TPUs may form based on catalyst concentration.

Mechanical Properties of TPUs

Figure 6:
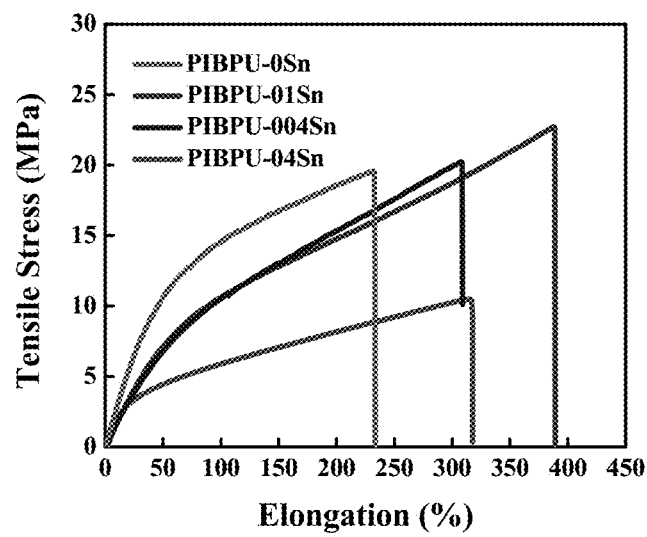
FIG. 6 is a plot of Tensile Stress (MPa) vs. Elongation (%).

FIG. 6 is a plot representing the stress-strain curves of PIB-based TPUs synthesized using different catalyst concentration. The sample PIBPU-1Sn could not be compression molded into films with good quality. It is clear that, when the TPUs was synthesized using 0.4 mol % of Sn(oct)$_2$ catalyst, tensile strength at break only reached ~10 MPa, similar to previous results. However, when the catalyst concentration was decreased to 0.1 mol % or lower, tensile strength at break significantly increased to 21 MPa. As catalyst concentration decreased, elongation of break was also enhanced, around 350%.

Table 6 describes the tensile strength (UTS) and the percent elongation (UTE) measurements of PIB(OH)$_2$-based TPUs.

TABLE 6

PIB-Based TPUs Mechanical Properties

| TPU sample | Sn(oct)$_2$ | $M_n$ (kg/mol) | PDI | UTS (MPa) | UTE (%) |
|---|---|---|---|---|---|
| PIBPU-0Sn | 0 | 64.5 | 1.58 | 20 | 233 |
| PIBPU-004Sn | 0.04% | 75.0 | 2.09 | 21 ± 1 | 350 ± 30 |

TABLE 6-continued

PIB-Based TPUs Mechanical Properties

| TPU sample | Sn(oct)$_2$ | $M_n$ (kg/mol) | PDI | UTS (MPa) | UTE (%) |
|---|---|---|---|---|---|
| PIBPU-01Sn | 0.1% | 101.9 | 2.17 | 21 ± 1 | 310 ± 20 |
| PIBPU-04Sn | 0.4% | 167.5 | 1.62 | 10 ± 1 | 280 ± 40 |
| PIBPU-1Sn | 1.0% | 103.5 | 1.83 | 9 ± 1 | 350 ± 50 |

Oxidation of TPUs

A study of the oxidative stability of PIB(OH)$_2$-based TPUs and PIB(allyl-OH)$_2$-based TPUs was performed by subjecting the PIB-based TPUs to KMnO$_4$ in THF/water at 70° C. for 24 h.

Figure 7:
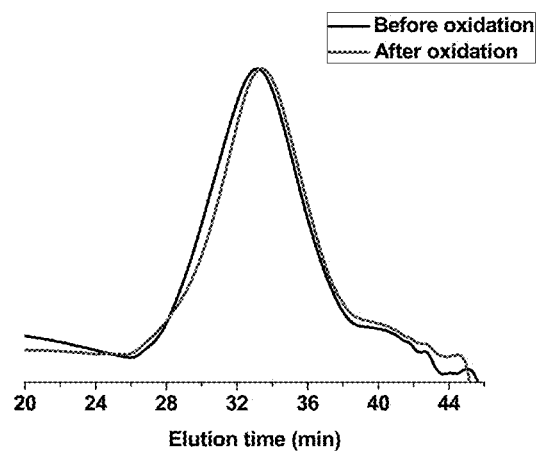
FIG. 7 is a plot of the elution time (min) of PIB(OH)$_2$-based TPU before and after attempted oxidation.

FIG. 7 is a plot that represents results of the size exclusion chromatography (SEC) performed on the PIB(OH)$_2$-based TPU before and after attempted oxidation. Table 7 demonstrates that the molecular weight and the MWD of the PIB(OH)$_2$-based TPU remained unchanged after oxidation, suggesting that the amide linkage of the TPUs is not affected during oxidation.

TABLE 7

GPC data of PIB(OH)$_2$-based TPU before and after oxidation

| | Before Oxidation | | After Oxidation | |
|---|---|---|---|---|
| Run | $M_n$ (kg · mol$^{-1}$) | MWD | $M_n$ (kg · mol$^{-1}$) | MWD |
| PIB-PUR | 158.0 | 3.10 | 156.1 | 2.99 |

Figure 8:
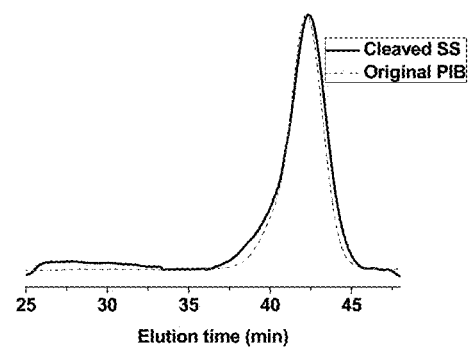
FIG. 8 is a plot of the elution time (min) of PIB(allyl-OH)$_2$ overlaid on the elution time of cleaved PIB(allyl-OH)$_2$-based TPU.

The PIB(allyl-OH)$_2$-based TPU was subjected to the same oxidative conditions and oxidized at the C=C double bond. From the cleaved material, the soft segment and hard segment were separated by repeated dissolution and precipitation in hexane and methanol. FIG. 8 is a plot that represents the results of the SEC performed on PIB(allyl-OH)$_2$ overlaid on top of the results of the SEC performed on the cleaved soft segment. The SEC-RI tract of the soft segment was exactly identical to the original PIB before TPU synthesis.

Figure 9:
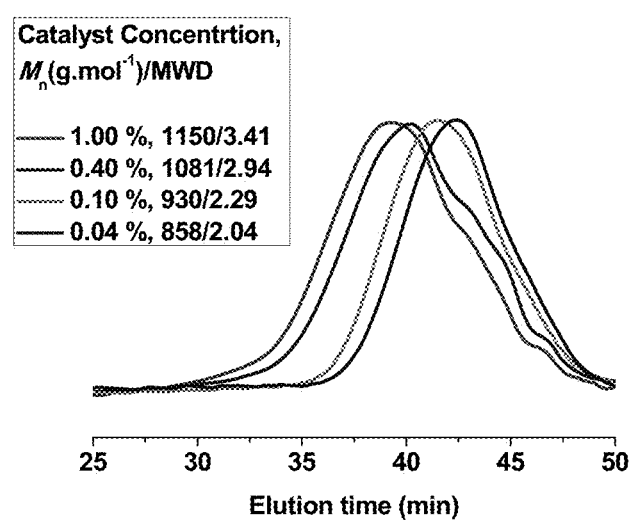
FIG. 9 is a plot of the elution time (min) of the hard segment of cleaved PIB(allyl-OH)$_2$-based TPU.

FIG. 9 is a plot that represents the SEC-RI of the cleaved hard segment measured in THF using a do/dc value of 0.24 mL/g. Table 8 demonstrates that as catalyst concentration increased, the MWD of the hard segment increased.

TABLE 8

GPC of the hard segment after oxidation of PIB(allyl-OH)$_2$-based TPUs

| Run | Catalyst Concentration (%) | MW of HS ($M_n$/PDI) |
|---|---|---|
| PSPU-1 | 0.04 | 0.86k/2.04 |
| PSPU-2 | 0.10 | 0.93k/2.29 |
| PSPU-3 | 0.40 | 1.08k/2.94 |
| PSPU-4 | 1.00 | 1.15k/3.41 |

CONCLUSION

In summary, it has been shown that catalyst concentration has significant effects on the morphology and mechanical properties of PIB-based TPUs. While the PIB-based TPUs synthesized at different catalyst concentrations have similar degree of microphase separation, varying the catalyst concentration leads to substantial changes in domain spacing.

Strikingly, the mechanical properties of PIB-based TPUs can be significantly improved by lowering the catalyst concentration. This is attributed to the narrower MWD of the hard segments upon decreasing the catalyst concentration. These results may help prepare PIB based TPUs with both high mechanical strength and excellent biostability.

EQUIVALENTS

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method of forming a polyisobutylene-based thermoplastic urethane, comprising the steps of:
   a) reacting a polyisobutylene macrodiol and/or diamine with a diisocyanate to form a first reaction mixture;
   b) combining a metal catalyst and a chain extender with the first reaction mixture to create a second reaction mixture, a molar ratio of the metal catalyst to the diisocyanate being greater than 0.0:1 and less than or equal to 0.001:1; and
   c) reacting the second reaction mixture for a period of time sufficient to form the polyisobutylene-based thermoplastic urethane.

2. The method of claim 1, wherein the polyisobutylene-based thermoplastic urethane comprises:
   (1) a hard segment in the amount of 10% to 60% by weight of the polyisobutylene-based thermoplastic urethane, wherein the hard segment includes a urethane; and
   (2) a soft segment in the amount of 40% to 90% by weight of the polyisobutylene-based thermoplastic urethane, wherein the soft segment includes the polyisobutylene macrodiol and/or diamine;
wherein the number average molecular weight of the polyisobutylene-based thermoplastic urethane greater than or equal to about 40 kilodaltons;
wherein the polydispersity index of the elastomeric polymer is between 1.58 and 2.17, inclusive; and
wherein the soft segment does not include a polyether macrodiol.

3. The method of claim 1, wherein the first reaction mixture consists essentially of a polyisobutylene macrodiol and/or diamine and a diisocyanate.

4. The method of claim 2, wherein the number average molecular weight of the polyisobutylene-based thermoplastic urethane is greater than or equal to 50 kilodaltons.

5. The method of claim 2, wherein the polyisobutylene macrodiol or diamine is of the formula:

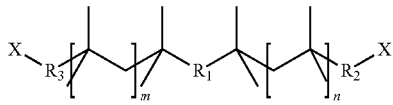

wherein:
each X is independently —OH, —NH$_2$, or —NHR$_4$;
R$_1$ is an initiator residue;
R$_2$, R$_3$, and R$_4$ is, each independently, a C$_1$-C$_{16}$ alkyl, a C$_3$-C$_{16}$ cycloalkyl, a C$_2$-C$_{16}$ alkenyl, a C$_3$-C$_{16}$ cycloalkenyl, a C$_2$-C$_{16}$ alkynyl, a C$_3$-C$_{16}$ cycloalkynyl, or a C$_6$-C$_{18}$ aryl, wherein, for each occurrence, R$_2$ or R$_3$ is, independently, optionally substituted with one or more groups selected from halo, cyano, nitro, dialkylamino, trialkylamino, C$_1$-C$_{16}$ alkoxy, and C$_1$-C$_{16}$ haloalkyl; and
n and m are each, independently, integers from 1 to 500.

6. The method of claim 2, wherein the hard segment is present in the amount of from about 30% to about 50% by weight of the elastomeric polymer.

7. The method of claim 1, wherein the polyisobutylene macrodiol is hydroxyallyl telechelic polyisobutylene.

8. The method of claim 1, wherein the polyisobutylene macrodiol is hydroxyalkyl telechelic polyisobutylene.

9. The method of claim 8, wherein the polyisobutylene macrodiol is hydroxypropyl telechelic polyisobutylene.

10. The method of claim 1, wherein the polyisobutylene macrodiamine is aminoallyl telechelic polyisobutylene.

11. The method of claim 1, wherein the number average molecular weight of the polyisobutylene macrodiol is about 400 Da to about 6000 Da.

12. The method of claim 1, wherein the number average molecular weight of the polyisobutylene macrodiol is about 1000 Da to about 3000 Da.

13. The method of claim 1, wherein the diisocyanate includes at least one member selected from the group consisting of 4,4'-methylenephenyl diisocyanate; methylene diisocyanate; p-phenylene diisocyanate; cis-cyclohexane-1,4-diisocyanate; trans-cyclohexane-1,4-diisocyanate; a mixture of cis-cyclohexane-1,4-diisocyanate and trans-cyclohexane-1,4-diisocyanate; 1,6-hexamethylene diisocyanate; 2,4-toluene diisocyanate; cis-2,4-toluene diisocyanate; trans-2,4-toluene diisocyanate; a mixture of cis-2,4-toluene diisocyanate and trans-2,4-toluene diisocyanate; p-tetramethylxylene diisocyanate; and m-tetramethylxylene diisocyanate.

14. The method of claim 1, wherein the chain extender is selected from the group consisting of a C2-C12 alkyl diol and a C2-C12 alkyl diamine.

15. The method of claim 14, wherein the chain extender is a C2-C6 alkyl diol.

16. The method of claim 1, wherein the chain extender includes at least one member selected from the group consisting 1,4-bunatediol; 1,5-pentanediol; 1,6-hexanediol; 1,8-octanediol; 1,9-nonanediol; 1,10-decanediol; 1,12-dodecanediol; 1,4-cyclohexane dimethanol; p-xyleneglycol; and 1,4-bis(2-hydroxyethoxy)benzene.

17. The method of claim 1, wherein the chain extender includes at least one member selected from the group consisting of 1,4-diaminobutane; 1,5-diaminopentane; 1,6-diaminohexane; 1,8-diaminooctane; 1,9-diaminononane; 1,10-diaminodecane; 1,12-diaminododecane; 1,4-diaminocyclohexane; 2,5-diaminoxylene; and isophoronediamine.

18. The method of claim 1, wherein the diisocyanate is 4,4'-methylenephenyl diisocyanate and wherein the chain extender is 1,4-butanediol.

19. The method of claim 1, wherein:
the polyisobutylene macrodiol is hydroxyallyl telechelic polyisobutylene;
the diisocyanate is 4,4'-methylenephenyl diisocyanate; and
the chain extender is 1,4-butanediol.

20. A method of forming a polyisobutylene-based thermoplastic urethane, comprising the steps of:

a) reacting a polyisobutylene diol with a diisocyanate to form a reaction mixture;
b) combining a metal-catalyst and an alkyl diol with the reaction mixture, a molar ratio x of elemental metal of the metal-catalyst to diisocyanate being in a range of greater than 0.0:1 and equal to or less than 0.001:1; and
c) reacting the mixture with the metal-catalyst and the alkyl diol for a period of time sufficient to form the polyisobutylene-based thermoplastic urethane.

21. A method of claim 20, wherein the polyisobutylene diol has the structural formula:

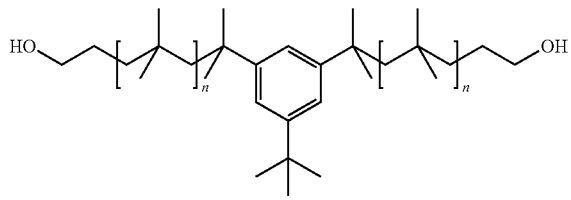

wherein n is a number in a range between about 5 and about 200.

22. The method of claim 21, wherein the diisocyanate is methylene bis(phenylisocyanate).

23. The method of claim 22, wherein the alkyl diol is 1,4-butanediol.

24. The method of claim 23, wherein the metal catalyst is Tin(II) 2-ethylhexanoate.

25. The method of claim 1, wherein the molar ratio of the metal catalyst to the diisocyanate is equal to 0.001:1.

26. The method of claim 1, wherein the motor ratio of the diisocyanate is equal to 0.0004:1.

27. The method claim 21, wherein the molar ratio of metal catalyst to the diisocyanate is equal to 0.001:1.

28. The method of claim 21, wherein the molar ratio of metal catalyst to the diisocyanate is equal to 0.0004:1.

* * * * *